United States Patent
Hande et al.

(10) Patent No.: US 11,564,240 B2
(45) Date of Patent: Jan. 24, 2023

(54) CELL DORMANCY TECHNIQUES FOR TRAFFIC

(71) Applicant: QUALCOMM Incorporated, San Diego, CA (US)

(72) Inventors: Prashanth Haridas Hande, San Diego, CA (US); Peter Pui Lok Ang, San Diego, CA (US); Peerapol Tinnakornsrisuphap, San Diego, CA (US); Hemanth Sampath, San Diego, CA (US); Yacob Cohen-Arazi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 134 days.

(21) Appl. No.: 17/209,537

(22) Filed: Mar. 23, 2021

(65) Prior Publication Data

US 2022/0312429 A1 Sep. 29, 2022

(51) Int. Cl.
*H04W 72/12* (2009.01)

(52) U.S. Cl.
CPC ... *H04W 72/1205* (2013.01); *H04W 72/1289* (2013.01)

(58) Field of Classification Search
None
See application file for complete search history.

(56) References Cited

U.S. PATENT DOCUMENTS

| | | | | |
|---|---|---|---|---|
| 2013/0229931 A1* | 9/2013 | Kim | ............... | H04L 5/0053 370/252 |
| 2014/0010131 A1* | 1/2014 | Gaal | ............... | H04L 5/001 370/311 |
| 2016/0360454 A1* | 12/2016 | Soldati | ............... | H04W 76/28 |
| 2020/0389933 A1* | 12/2020 | Ang | ............... | H04W 80/02 |
| 2020/0404604 A1* | 12/2020 | Hande | ............... | H04W 72/1278 |
| 2021/0266828 A1* | 8/2021 | Hwang | ............... | H04W 72/14 |
| 2022/0109547 A1* | 4/2022 | Svedman | ............... | H04L 5/0053 |
| 2022/0232605 A1* | 7/2022 | Kim | ............... | H04W 72/14 |
| 2022/0264448 A1* | 8/2022 | Gonuguntla | ............... | H04L 5/0023 |

OTHER PUBLICATIONS

International Search Report and Written Opinion—PCT/US2022/019501—ISA/EPO—dated Jun. 22, 2022.
(Continued)

*Primary Examiner* — Jenkey Van
(74) *Attorney, Agent, or Firm* — Holland & Hart LLP

(57) ABSTRACT

Methods, systems, and devices for wireless communications are described. A user equipment (UE) and a base station may identify a burst periodicity for communication bursts over one or more cells, such as secondary cells (SCells) in accordance with a multi-carrier communication scheme. The UE and the base station may determine a cell dormancy pattern for switching the SCells between an active state and a dormant state based on the burst periodicity. The base station and the UE may use one or more bandwidth parts (BWPs) for communications and may configure the UE to perform BWP switching over the SCell during the dormancy state switching operation. The base station and the UE may communicate the bursts while the SCells are in the active state and may switch the SCells between the active state and the dormant state based on the cell dormancy pattern.

30 Claims, 18 Drawing Sheets

(56) References Cited

OTHER PUBLICATIONS

Qualcomm Incorporated., et al., "Discussion on Fast SCell Activation Based on Measurements Prior to Activation in NR", 3GPP TSG RAN WG2 Meeting #107, 3GPP Draft, R2-1908684—Discussion on Fast SCell Activation Based on Measurements Prior to Activation in NR, 3rd Generation Partnership Project (3GPP), Mobile Competence Centre, 650, Route Des Lucioles, F-06921 Sophia-Antipolis Cedex, France, vol. RAN WG2, No. Prague, Czech, Aug. 26, 2019-Aug. 30, 2019, Aug. 16, 2019 (Aug. 16, 2019), 13 Pages, XP051761746, Retrieved from the Internet: URL: http://www.3gpp.org/ftp/tsg_ran/WG2_RL2/TSGR2_107/Docs/R2-1908684.zip, [retrieved on Aug. 16, 2019], figures 3-6 table 2, 2.3 Dormant BWP, 2.4 Discussion for Re1-16 solutions.

Xiaomi Communications: "Initial Views on the PDCCH Monitoring for Power Saving", 3GPP TSG RAN WG1 Meeting #94bis, 3GPP Draft, R1-1811392, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 28, 2018 (Sep. 28, 2018), 3 Pages, XP051518796, Retrieved from the Internet: URL: http://www.3gpp.org/ftp/tsg%5Fran/WG1%5FRL1/TSGR1%5F94b/Docs/R1%2D1811392%2Ezip, [retrieved on Sep. 28, 2018], The whole document.

\* cited by examiner

CELL DORMANCY TECHNIQUES FOR TRAFFIC

FIELD OF TECHNOLOGY

The following relates to wireless communications, including cell dormancy techniques for traffic.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support cell dormancy techniques for traffic. Generally, the described techniques provide for a user equipment (UE) and a base station to switch dormancy states of a cell (e.g., a secondary cell (SCell) in a multi-carrier communications scheme that includes a primary cell (PCell) and one or more SCells) based on a communication burst periodicity. In some cases, the UE and the base station may determine a burst periodicity for communication bursts over the SCell. For example, the base station may transmit control signaling to the UE including scheduling information for the communication bursts. In some examples, the base station, the UE, or both, may use a non-dormant state of the SCell to reduce latency for a communication burst arrival (e.g., enabling communications on the SCell for a duration of the burst) and may use a dormant state of the SCell to reduce power consumption (e.g., where the dormant state may be associated with relatively reduced number of processes performed on the SCell) between communication bursts. The UE and the base station may perform the SCell dormancy switching operation (e.g., between the dormant and non-dormant states) according to a cell dormancy pattern, which may be determined by the UE and the base station based on the burst periodicity. In some cases, the base station, the UE, or both, may use one or more bandwidth parts (BWPs) for communications and may configure the UE, the base station, or both, to perform BWP switching over the SCell during the dormancy state switching operation. In such cases, different BWPs for the SCell, or the PCell, or both, may be used based on the dormancy state of the SCell. In some examples, the UE may be an example of, or may be coupled with, an extended reality (XR) device.

A method for wireless communications at a UE is described. The method may include identifying a burst periodicity associated with a set of multiple bursts of communications between the UE and a base station, where the set of multiple bursts are communicated over a PCell and one or more SCells in accordance with a multi-carrier communications scheme, determining a cell dormancy pattern for switching the one or more SCells between an active state and a dormant state, where the cell dormancy pattern is based on the identified burst periodicity, and communicating the set of multiple bursts based on switching the one or more SCells between the active state to the dormant state using the cell dormancy pattern, where each burst of the set of multiple bursts is communicated while the one or more SCells are in the active state.

An apparatus for wireless communications at a UE is described. The apparatus may include a processor, memory coupled with the processor, and instructions stored in the memory. The instructions may be executable by the processor to cause the apparatus to identify a burst periodicity associated with a set of multiple bursts of communications between the UE and a base station, where the set of multiple bursts are communicated over a PCell and one or more SCells in accordance with a multi-carrier communications scheme, determine a cell dormancy pattern for switching the one or more SCells between an active state and a dormant state, where the cell dormancy pattern is based on the identified burst periodicity, and communicate the set of multiple bursts based on switching the one or more SCells between the active state to the dormant state using the cell dormancy pattern, where each burst of the set of multiple bursts is communicated while the one or more SCells are in the active state.

Another apparatus for wireless communications at a UE is described. The apparatus may include means for identifying a burst periodicity associated with a set of multiple bursts of communications between the UE and a base station, where the set of multiple bursts are communicated over a PCell and one or more SCells in accordance with a multi-carrier communications scheme, means for determining a cell dormancy pattern for switching the one or more SCells between an active state and a dormant state, where the cell dormancy pattern is based on the identified burst periodicity, and means for communicating the set of multiple bursts based on switching the one or more SCells between the active state to the dormant state using the cell dormancy pattern, where each burst of the set of multiple bursts is communicated while the one or more SCells are in the active state.

A non-transitory computer-readable medium storing code for wireless communications at a UE is described. The code may include instructions executable by a processor to identify a burst periodicity associated with a set of multiple bursts of communications between the UE and a base station, where the set of multiple bursts are communicated over a PCell and one or more SCells in accordance with a multi-carrier communications scheme, determine a cell dormancy pattern for switching the one or more SCells between an active state and a dormant state, where the cell dormancy pattern is based on the identified burst periodicity, and communicate the set of multiple bursts based on switching the one or more SCells between the active state to the dormant state using the cell dormancy pattern, where each burst of the set of multiple bursts is communicated while the one or more SCells are in the active state.

Some examples of the method, apparatuses, and non-transitory computer-readable medium described herein may further include operations, features, means, or instructions for receiving, from the base station, an indication of a timer configuration for a timer associated with the cell dormancy pattern, where the set of multiple bursts may be communicated based on the timer configuration.

Some examples of the method, apparatuses, and non-transitory computer-readable medium described herein may further include operations, features, means, or instructions for starting the timer at a first time corresponding to arrival of a first burst of the set of multiple bursts and determining that the timer may have expired at a second time after the first time based on the timer configuration, where a second burst of the set of multiple bursts may be communicated based on the timer expiring, and where the second burst may be communicated based on the one or more SCells switching to the active state.

Some examples of the method, apparatuses, and non-transitory computer-readable medium described herein may further include operations, features, means, or instructions for resetting the timer according to the timer configuration based on determining that the timer may have expired.

Some examples of the method, apparatuses, and non-transitory computer-readable medium described herein may further include operations, features, means, or instructions for switching the one or more SCells to the active state using the cell dormancy pattern may be based on an availability of traffic associated with the communications.

Some examples of the method, apparatuses, and non-transitory computer-readable medium described herein may further include operations, features, means, or instructions for operating in a first BWP for the PCell when the one or more SCells may be in the active state, the first BWP having a first bandwidth and switching to a second BWP for the PCell based on the burst periodicity, the second BWP having a second bandwidth that may be less than the first bandwidth, where switching to the second BWP corresponds to a duration for switching the one or more SCells to the dormant state using the cell dormancy pattern.

Some examples of the method, apparatuses, and non-transitory computer-readable medium described herein may further include operations, features, means, or instructions for modifying a downlink control monitoring periodicity on the PCell based on switching to the second BWP of the PCell.

Some examples of the method, apparatuses, and non-transitory computer-readable medium described herein may further include operations, features, means, or instructions for modifying a parameter value corresponding to a slot offset between a scheduling grant and data reception on the PCell based on switching to the second BWP of the PCell.

Some examples of the method, apparatuses, and non-transitory computer-readable medium described herein may further include operations, features, means, or instructions for operating in an active BWP for each SCell of the one or more SCells when communicating each burst of the set of multiple bursts, the active BWP having a first bandwidth and switching to a dormant BWP for the each SCell of the one or more SCells based on an inactivity timer, the dormant BWP having a second bandwidth that may be less than the first bandwidth, where switching to the dormant BWP corresponds to switching the one or more SCells to the dormant state using the cell dormancy pattern.

In some examples of the method, apparatuses, and non-transitory computer-readable medium described herein, identifying the burst periodicity may include operations, features, means, or instructions for receiving scheduling information indicating at least one of the burst periodicity or one or more scheduling grants for the set of multiple bursts of the communications and identifying the burst periodicity based on the scheduling information.

Some examples of the method, apparatuses, and non-transitory computer-readable medium described herein may further include operations, features, means, or instructions for receiving, from the base station, downlink control signaling indicating a switch to a dormant BWP, where the downlink control signaling may be triggered by a packet data convergence protocol (PDCP) buffer status corresponding to empty and switching from an active BWP to the dormant BWP based on the downlink control signaling.

Some examples of the method, apparatuses, and non-transitory computer-readable medium described herein may further include operations, features, means, or instructions for transmitting, to the base station, a value of remaining battery power at the UE, where one or more parameters associated with the cell dormancy pattern may be based on the value of remaining battery power.

Some examples of the method, apparatuses, and non-transitory computer-readable medium described herein may further include operations, features, means, or instructions for transmitting, to the base station, a charging status of the UE, where one or more parameters associated with the cell dormancy pattern may be based on the charging status, where the charging status includes at least one of an active charge status, an idle charge status, or an inactive charge status.

In some examples of the method, apparatuses, and non-transitory computer-readable medium described herein, the UE may be operating according to one or more capabilities associated with a virtual reality (VR) system, an augmented reality (AR) system, a mixed reality system, a cloud gaming system, or a combination thereof.

A method for wireless communications at a base station is described. The method may include identifying a burst periodicity associated with a set of multiple bursts of communications between the base station and a UE, where the set of multiple bursts are communicated over a PCell and one or more SCells in accordance with a multi-cell communications scheme, configuring a cell dormancy pattern for switching the one or more SCells between an active state and a dormant state, where the cell dormancy pattern is based on the identified burst periodicity, and communicating the set of multiple bursts of the communications based on switching the one or more SCells between the active state to the dormant state using the cell dormancy pattern, where each burst of the set of multiple bursts is communicated while the one or more SCells are in the active state.

An apparatus for wireless communications at a base station is described. The apparatus may include a processor, memory coupled with the processor, and instructions stored in the memory. The instructions may be executable by the processor to cause the apparatus to identify a burst periodicity associated with a set of multiple bursts of communications between the base station and a UE, where the set of multiple bursts are communicated over a PCell and one or more SCells in accordance with a multi-cell communications scheme, configure a cell dormancy pattern for switching the one or more SCells between an active state and a dormant state, where the cell dormancy pattern is based on the identified burst periodicity, and communicate the set of multiple bursts of the communications based on switching the one or more SCells between the active state to the dormant state using the cell dormancy pattern, where each burst of the set of multiple bursts is communicated while the one or more SCells are in the active state.

Another apparatus for wireless communications at a base station is described. The apparatus may include means for identifying a burst periodicity associated with a set of multiple bursts of communications between the base station and a UE, where the set of multiple bursts are communicated over a PCell and one or more SCells in accordance with a multi-cell communications scheme, means for configuring a cell dormancy pattern for switching the one or more SCells between an active state and a dormant state, where the cell dormancy pattern is based on the identified burst periodicity, and means for communicating the set of multiple bursts of the communications based on switching the one or more SCells between the active state to the dormant state using the cell dormancy pattern, where each burst of the set of multiple bursts is communicated while the one or more SCells are in the active state.

A non-transitory computer-readable medium storing code for wireless communications at a base station is described. The code may include instructions executable by a processor to identify a burst periodicity associated with a set of multiple bursts of communications between the base station and a UE, where the set of multiple bursts are communicated over a PCell and one or more SCells in accordance with a multi-cell communications scheme, configure a cell dormancy pattern for switching the one or more SCells between an active state and a dormant state, where the cell dormancy pattern is based on the identified burst periodicity, and communicate the set of multiple bursts of the communications based on switching the one or more SCells between the active state to the dormant state using the cell dormancy pattern, where each burst of the set of multiple bursts is communicated while the one or more SCells are in the active state.

Some examples of the method, apparatuses, and non-transitory computer-readable medium described herein may further include operations, features, means, or instructions for determining a timer configuration for an inactivity timer associated with the cell dormancy pattern based on the burst periodicity and transmitting, to the UE, an indication of the timer configuration, where the set of multiple bursts may be communicated based on the timer configuration, and where the inactivity timer corresponds to the one or more SCells being in the dormant state.

Some examples of the method, apparatuses, and non-transitory computer-readable medium described herein may further include operations, features, means, or instructions for determining that an application layer may be preparing for at least one burst of the set of multiple bursts, where switching the one or more SCells to the active state using the cell dormancy pattern may be based on the application layer preparing for the at least one burst.

In some examples of the method, apparatuses, and non-transitory computer-readable medium described herein, identifying the burst periodicity may include operations, features, means, or instructions for determining a buffer status of a PDCP buffer and identifying the burst periodicity based on the buffer status including an empty status.

Some examples of the method, apparatuses, and non-transitory computer-readable medium described herein may further include operations, features, means, or instructions for transmitting, to the UE and based on the buffer status including the empty status, downlink control signaling indicating a switch from an active BWP to a dormant BWP.

In some examples of the method, apparatuses, and non-transitory computer-readable medium described herein, identifying the burst periodicity may include operations, features, means, or instructions for identifying a set of metadata associated with the communications based on reading one or more packet headers of the communications and identifying the burst periodicity based on the set of metadata.

Some examples of the method, apparatuses, and non-transitory computer-readable medium described herein may further include operations, features, means, or instructions for transmitting, to the UE and based on the set of metadata, downlink control signaling indicating a switch from first BWP to a second BWP, where the first BWP may have a first bandwidth that may be greater than a second bandwidth of the second BWP, and where the second BWP may be associated with the dormant state of the one or more SCells.

Some examples of the method, apparatuses, and non-transitory computer-readable medium described herein may further include operations, features, means, or instructions for operating in a first BWP for the PCell when communicating each burst of the set of multiple bursts, the first BWP having a first bandwidth and switching to a second BWP for the PCell based on the burst periodicity, the second BWP having a second bandwidth that may be less than the first bandwidth, where switching to the second BWP corresponds to switching the one or more SCells to the dormant state using the cell dormancy pattern.

Some examples of the method, apparatuses, and non-transitory computer-readable medium described herein may further include operations, features, means, or instructions for operating in an active BWP for each SCell of the one or more SCells when communicating each burst of the set of multiple bursts, the active BWP having a first bandwidth and switching to a dormant BWP for the each SCell of the one or more SCells based on an inactivity timer, the dormant BWP having a second bandwidth that may be less than the first bandwidth, where switching to the dormant BWP corresponds to switching the one or more SCells to the dormant state using the cell dormancy pattern.

Some examples of the method, apparatuses, and non-transitory computer-readable medium described herein may further include operations, features, means, or instructions for transmitting, to the UE, scheduling information indicating at least one of the burst periodicity or one or more scheduling grants for the communications, where the burst periodicity may be based on the scheduling information.

In some examples of the method, apparatuses, and non-transitory computer-readable medium described herein, configuring the cell dormancy pattern may include operations, features, means, or instructions for determining that traffic may be available at a PDCP layer, where switching the one or more SCells to the active state using the cell dormancy pattern may be based on the traffic being available.

Some examples of the method, apparatuses, and non-transitory computer-readable medium described herein may further include operations, features, means, or instructions for receiving, from the UE, a value of remaining battery power at the UE, where the cell dormancy pattern may be based on the value of remaining battery power.

Some examples of the method, apparatuses, and non-transitory computer-readable medium described herein may further include operations, features, means, or instructions for receiving, from the UE, a charge status of the UE, where the cell dormancy pattern may be based on the charge status, where the charge status includes at least one of an active charge status, an idle charge status, or an inactive charge status.

In some examples of the method, apparatuses, and non-transitory computer-readable medium described herein, the base station may be operating according to one or more

DETAILED DESCRIPTION

Figure 1:
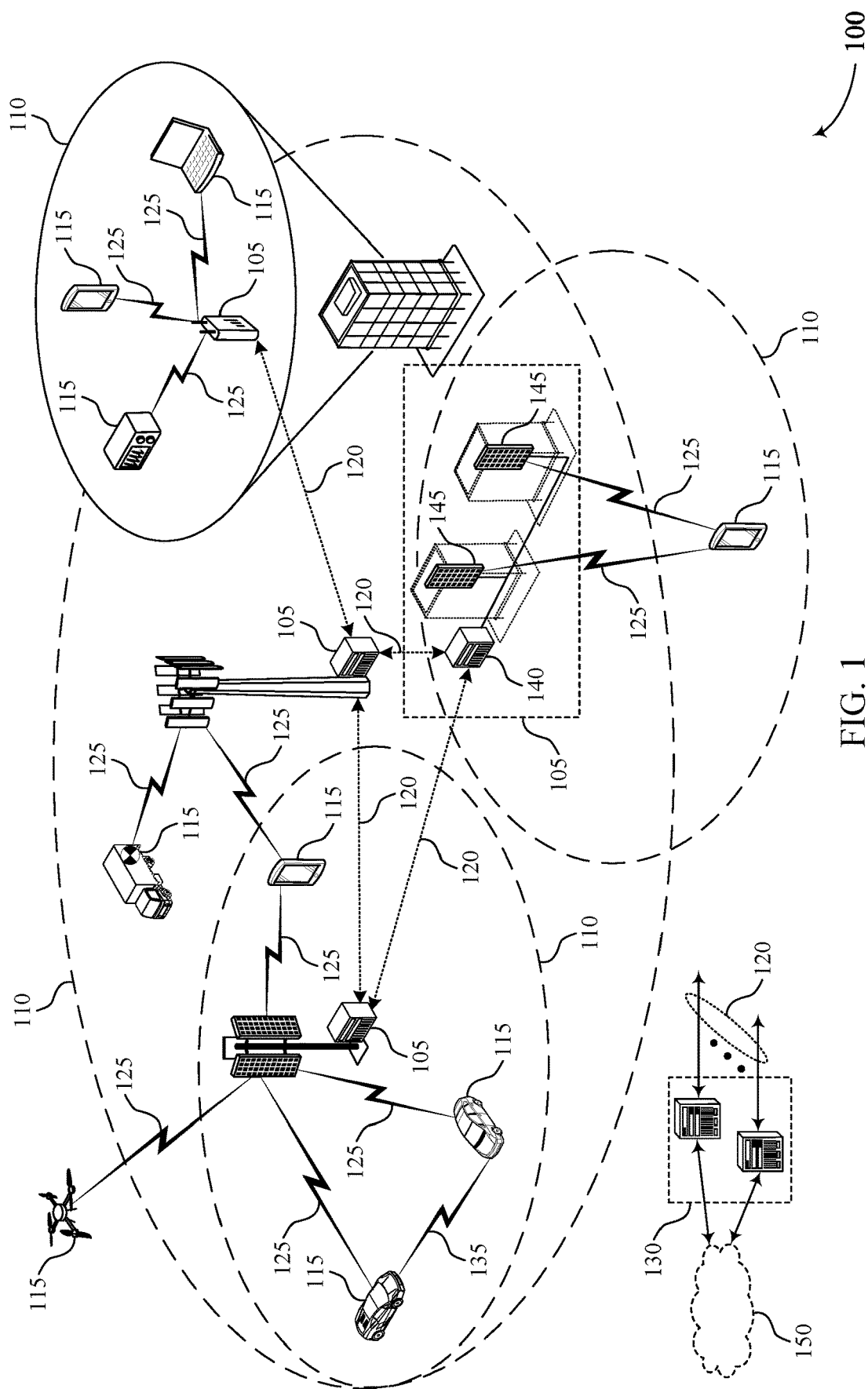
FIGS. 1 and 2 illustrate examples of wireless communications systems that support cell dormancy techniques for traffic in accordance with aspects of the present disclosure.

In some wireless communications systems, a user equipment (UE) may perform low-latency communications with another device or a base station. In addition, it may be important for the UE to operate with relatively low power consumption (e.g., based on battery life constraints, thermal constraints, or the like). As an example, the UE may support functionality associated with augmented reality (AR), virtual reality (VR), or mixed reality systems and applications, which may be referred to as extended reality (XR) systems and applications, and the UE may accordingly use various techniques to increase battery life at the UE when operating in such systems. A base station in an XR system may schedule the low-latency communications for the UE over a primary cell (PCell) and one or more secondary cells (SCells).

The base station may control (e.g., via downlink control information (DCI)) a dormancy state at each SCell based on the communications at the SCell. For example, the base station may transition each SCell to a dormant state when there is relatively little or no traffic associated with the SCell. Additionally or alternatively, the base station may transition each SCell to a non-dormant state when there is a relatively high traffic load at the SCell. In some examples, the SCell may switch to a dormant bandwidth part (BWP) (e.g., when the SCell is dormant) or a non-dormant BWP (e.g., when the SCell is non-dormant, active). Such techniques, however, may not account for a periodicity of the low-latency communications when transitioning the SCells into a dormant or non-dormant state. As an example, XR communications between a UE and base station may be low-latency power constrained traffic that is relatively bursty (e.g., comprising one or more bursts and having some periodicity or quasi-periodicity), and it may be desirable to use techniques that provide enhanced efficiency and reduced signaling overhead for transitioning between dormant and non-dormant states, for example, based on the communications bursts.

As described herein, a UE and base station may utilize a cell dormancy pattern for switching one or more SCells between an active state (e.g., a non-dormant state) and a dormant state, where the cell dormancy pattern is based on, for example, a burst periodicity. In particular, a UE and base station may communicate low-latency power constrained communication bursts according to a periodicity. For example, the base station, which may implement multi-carrier communications that correspond to an SCell and PCell, may determine a periodicity of the communication bursts at the UE based on learning the traffic periodicity, or receiving an indication of the traffic periodicity, or both. The base station may configure the UE with a dormancy configuration for switching dormancy states (e.g., from dormant to non-dormant or non-dormant to dormant) at the SCell according to the periodicity. For example, the SCell may enter a dormant state during a time period where the communication bursts are relatively infrequent or nonexistent, such as during a time period between respective communication bursts. In some other examples, the SCell may enter a non-dormant state during a time period when the communication bursts are relatively frequent or for a time period when the communication bursts are scheduled (e.g., with some periodicity). In some cases, switching dormancy states may include the SCell switching to a dormant BWP of the SCell if entering a dormant state, or switching to a non-dormant BWP of the SCell if entering a non-dormant state. In some examples, the base station may configure the switching operation according to a timer, such that when the timer expires the SCell switches dormancy states.

Aspects of the disclosure are initially described in the context of wireless communications systems. Aspects of the disclosure are further described in the context of dormancy state diagrams and a process flow. Aspects of the disclosure are further illustrated by and described with reference to apparatus diagrams, system diagrams, and flowcharts that relate to cell dormancy techniques for traffic.

FIG. 1 illustrates an example of a wireless communications system 100 that supports cell dormancy techniques for traffic in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125.

The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both, at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

A carrier may also be referred to as a component carrier, a layer, a channel, or the like. The term "component carrier" may refer to each of the multiple carriers utilized by a UE in carrier aggregation operation and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier. Multiple component carriers may be aggregated or utilized concurrently to provide some UEs 115 with greater bandwidth and, for example, higher data rates. Some UEs 115 may be configured with multiple component carriers in a multi-carrier mode. A carrier used for downlink may be referred to as a downlink component carrier, and a carrier used for uplink may be referred to as an uplink component carrier. A UE 115 may be configured with multiple downlink component carriers and one or more uplink component carriers, for example, for carrier aggregation or other schemes. Each carrier may be used to transmit control information (e.g., reference signals, control channels), overhead information, data, or the like.

A UE 115 may communicate with a single base station 105 utilizing multiple carriers, and may also communicate with multiple base stations simultaneously on different carriers. Each cell of a base station 105 may include an uplink component carrier and a downlink component carrier. The coverage area 110 of each serving cell for a base station 105 may be different (e.g., component carriers on different frequency bands may experience different path loss). In some examples, one carrier is designated as the primary carrier, or primary component carrier (PCC), for a UE 115, which may be served by a PCell. PCells may be semi-statically configured by higher layers (e.g., via radio resource control (RRC) signaling, or the like) on a per-UE basis. Some uplink control information (UCI), including, for example, acknowledgment (ACK)/negative acknowledgment (NACK) feedback, a channel quality indicator (CQI), and scheduling information transmitted on physical uplink control channel (PUCCH), among other examples, may be carried by the primary cell. Additional carriers may be designated as secondary carriers, or secondary component carriers (SCC), which may be served by SCells. Secondary cells may, in some cases, be semi-statically configured (e.g., activated, deactivated) on a per-UE basis. In some cases, SCells may not include or be configured to transmit the same control information as the PCell.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both, to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both, to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may communicate with another wireless device, which may have reduced power capabilities when compared with the UE 115. For example, the UE 115 may perform low-latency communications with an XR device in an XR system (e.g., including the UE 115 and the XR device), which may implement aspects of AR, VR, or mixed reality systems and applications. In other examples, a UE 115 may be an example of an XR device. In any case, the XR device may operate according to reduced power capabilities to meet a threshold power dissipation (e.g., based on the materials implemented on or within the XR device) or to reduce power consumption at the XR device. In some cases, the UE 115 and the base station 105 may communicate over a PCell and one or more SCells in accordance with a multi-carrier communications scheme. The base station 105 may transmit one or more communication bursts over an SCell based on a burst periodicity. In some cases, the SCell may operate according to two or more dormancy states, such as a non-dormant state and a dormant state. However, in some cases, a base station may not account for a periodicity of the low-latency communications, for example, including XR-related communications, when transitioning the SCells into a dormant or non-dormant state.

In some examples, to reduce power consumption at the XR device while maintaining functionality and reducing signaling overhead, the UE 115 and the base station 105 may switch between dormancy states of an SCell based on a communication burst periodicity. In some cases, the UE 115 and the base station 105 may determine a burst periodicity for communication bursts over the SCell. For example, the base station 105 may transmit control signaling to the UE 115 including scheduling information for the communication bursts. In some examples, the base station 105, the UE 115, or both, may use the SCell non-dormant state to reduce latency for a communication burst arrival and may use an SCell dormant state to reduce power consumption (e.g., at the UE, at the XR device, or both) after receiving the communication burst. In some cases, the base station 105, the UE 115, or both, may use one or more BWPs for communications and may configure the UE 115, the XR device, or both, to perform BWP switching over the SCell. That is, during the dormancy state switching operation for the SCell, the base station 105, the UE 115, or both, may also switch BWP states (e.g., from an active BWP to a dormant BWP).

Figure 2:
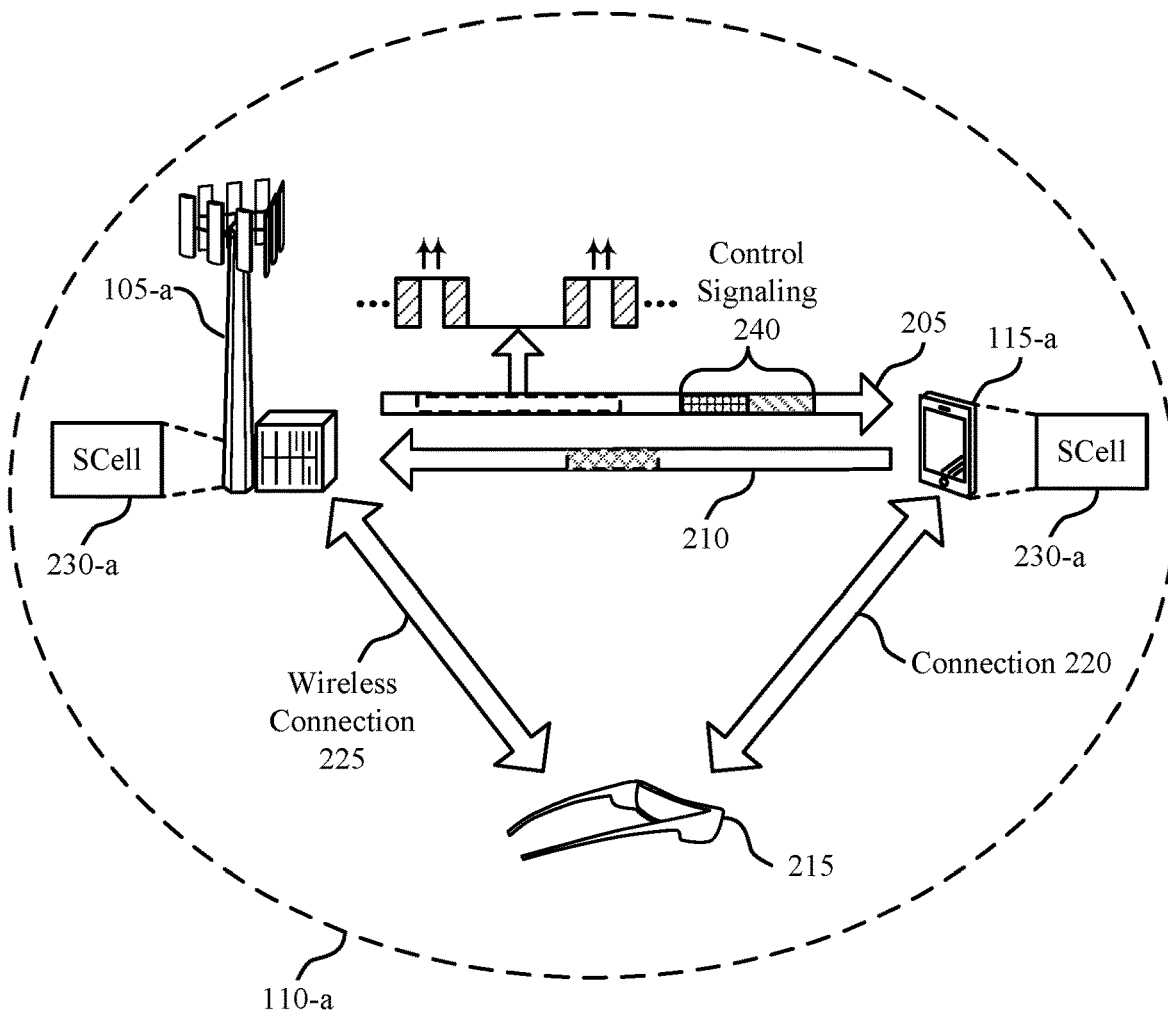

FIG. 2 illustrates an example of a wireless communications system 200 that supports cell dormancy techniques for traffic in accordance with aspects of the present disclosure. In some cases, wireless communications system 200 may implement aspects of wireless communications system 100 and may include UE 115-*a* and base station 105-*a* with coverage area 110-*a*, which may be examples of a UE 115 and a base station 105 with a coverage area 110 as described with reference to FIG. 1. In some cases, a UE 115 may receive control signaling, data, or both, from a base station 105 via a downlink communication link 205. Similarly, the UE 115 may transmit control signaling, data, or both, to the base station 105 via an uplink communication link 210. In some examples, base station 105-*a* may switch a dormancy state of a cell (e.g., an SCell) based on UE 115-*a* or base station 105-*a* identifying a pattern in a burst periodicity for low-latency communications.

In some cases, UE 115-*a* may communicate with another wireless device, which may have reduced power capabilities when compared with UE 115-*a*. For example, UE 115-*a* may communicate (e.g., using relatively low-latency communications) with an XR device 215 in an XR system. The XR device 215 may implement aspects of AR, VR, or mixed reality systems and applications, among other examples. The XR system may include UE 115-*a* and the XR device 215. The XR device 215 may be an example of AR glasses, VR glasses, a gaming device, or the like. In some cases, the XR device may be an example of a UE 115. Likewise, UE 115-*a* may be an example of an XR device. In some examples, the design for the XR device 215 may account for the reduced power capabilities to increase battery life (e.g., to match expectations for UE 115-*a*, which may be a smartphone used for a full day). Additionally or alternatively, the reduced power capabilities may be related to a thermal fluctuation threshold that may damage the XR device 215, or may affect a user experience, or the like.

In some examples, the XR device 215 may be tethered to UE 115-*a*, such as by connection 220. In some examples, the connection 220 may be an example of a universal serial bus (USB) connection. Other types of connections (e.g., wired connections, wireless connections) may be used for coupling the XR device 215 and the UE 115 via connection 220. In some examples, UE 115-*a* and the XR device 215 may communicate control signaling, data, or both, via connection 220 for an application running at the XR device 215, or at UE 115-*a*, or both. In some examples, the XR device 215 may share a battery with UE 115-*a*; however, the XR device 215, or the UE 115-*a*, or both, may operate according to reduced power capabilities. In some examples, the power dissipation (e.g., heat) through the material of the XR device may lead to uncomfortable user experience and a relatively short battery life.

In some other examples, the XR device 215 may communicate directly with base station 105-*a*. For example, the XR device 215 may establish a wireless connection 225, which may be an example of an NR connection, with base station 105-*a*. The XR device 215 may communicate data, control signaling, or both, with base station 105-*a* via the wireless connection 225 (e.g., for an application running at the XR device 215). Thus, the XR device 215 may be tethered to UE 115-*a*, may operate independent of UE 115-*a*, or both. In some examples, the XR device 215 may have similar processing capabilities as a UE 115. The signaling transmitted from base station 105-*a* to UE 115-*a* may also be transmitted directly to the XR device 215.

In some cases, UE 115-*a* and base station 105-*a* may communicate over a PCell and one or more SCells 230 in accordance with a multi-carrier communications scheme. For example, each SCell 230 may operate according to a different carrier frequency. Base station 105-*a* may transmit one or more communication bursts to UE 115-*a* over SCell 230-*a*. The communication bursts may include control signaling or data transmissions sent over a relatively short period of time. The communication bursts may be periodic or quasi-periodic based on a burst periodicity, which is described in further detail with respect to FIG. 4. In some cases, an SCell 230, such as SCell 230-*a*, may operate according to a dormancy state. For example, SCell 230-*a* may operate according to a dormant state or a non-dormant state, which may be sub-states within an activated state. In the dormant state, UE 115-*a* and base station 105-*b* may switch to a dormant BWP associated with SCell 230-*a*. Similarly, in the non-dormant state (e.g., an active state), UE 115-*a* and base station 105-*b* may switch to a non-dormant BWP, which may be referred to as an active BWP, associated with SCell 230-*a*, which is described in further detail with respect to FIG. 3.

In some examples, to reduce power consumption at the XR device 215 while maintaining functionality, UE 115-*a* and base station 105-*a* (or the XR device 215 and the base station, such as when the XR device 215 communicates directly with base station 105-*a* over the wireless connection 225) may switch dormancy states of SCell 230-*a* during a dormancy state switching period 235. In some cases, UE 115-*a* and base station 105-*a* may determine a burst periodicity for communication bursts over SCell 230-*a* between UE 115-*a* and base station 105-*a*. For example, base station 105-*a* may transmit control signaling 240 to UE 115-*a* (e.g., a downlink control information (DCI) message, a medium access control-control element (MAC-CE), RRC signaling, or the like). The control signaling 240 may include scheduling information 245 for the communication bursts. In some cases, the scheduling information 245 may explicitly indicate the burst periodicity. In some other cases, UE 115-*a* may infer the burst periodicity from the scheduling information 245. In cases where the XR device 215 is not tethered to UE 115-*a*, the XR device 215 may receive scheduling information 245 from base station 105-*a* via wireless connection 225. The XR device 215 may determine the burst periodicity for communication bursts between the XR device 215 and base station 105-*a* (e.g., based on the scheduling information 245 or via some other means).

In some examples, base station 105-*a*, UE 115-*a*, the XR device 215, or any combination thereof, may use the SCell active state to reduce latency for a burst arrival 250 and may use an SCell dormant state to reduce power consumption at the XR device 215, or UE 115-*a*, or both. That is, base station 105-*a*, UE 115-*a*, the XR device 215, or any combination thereof, may switch the SCell dormancy state for SCell 230-*a* between an active state and a dormant state at the cadence of the burst arrival 250 (e.g., according to a burst periodicity). For example, UE 115-*a* and base station 105-*a* may perform a dormancy state switching operation for SCell 230-*a*, which may include switching from a dormant state to an active (e.g., non-dormant), state during a dormancy state switching period 235 before burst arrival 250. After receiving the communication bursts in burst arrival 250, which may include low-latency power constrained traffic (LLPCT) for XR device 215, UE 115-*a* and base station 105-*a* may perform another dormancy state switching operation for SCell 230-*a* (e.g., during another dormancy state switching period 235) from the active state back to the dormant state.

In some cases, base station 105-*a*, UE 115-*a*, the XR device 215, or any combination thereof, may use one or more BWPs for communications (monitoring for signaling, receiving signaling, transmitting signaling, etc.). In some examples, base station 105-*a* may schedule communications with UE 115-*a*, the XR device 215, or both, across multiple slots, which may be referred to as cross-slot scheduling, within a carrier for SCell 230-*a*. Additionally or alternatively, base station 105-*a* may perform SCell-based power management and may configure UE 115-*a*, the XR device 215, or both, to perform BWP switching within the carrier. Each BWP may have a dormancy state. In some examples, during the dormancy state switching operation for SCell 230-*a*, base station 105-*a*, UE 115-*a*, or both, may also switch BWPs, which is described in further detail with respect to FIG. 6.

In some examples, there may be one or more triggers for performing the dormancy state switching operation according to a periodic or semi-periodic interval. For example, base station 105-*a*, UE 115-*a*, or both, may switch to a high-power state to serve traffic with periodic or semi-periodic intervals. In some cases, the dormancy switching operation may be triggered for SCell 230-*a* when traffic arrives at a higher layer of UE 115-*a* or base station 105-*a* (e.g., a packet data convergence protocol (PDCP) layer) from the application running at the XR device 215. In some examples, the trigger for performing the dormancy state switching operation may happen across one or more communication layers. For example, when a layer at UE 115-*a*, the XR device 215, or both, running an application (e.g., associated with an application layer) is expecting or preparing for a burst of traffic, the layer may directly signal to the modem to trigger switching to an active, or high-power, state. The signaling may occur before the data packet arrives at the modem.

In some examples, base station 105-*a* may transmit a timer configuration 255 to UE 115-*a* for the dormancy state switching operation. For example, the timer configuration 255 may indicate a timer that UE 115-*a*, base station 105-*a*, or both, start after a burst arrival 250. UE 115-*a*, base station 105-*a*, or both, may switch the dormancy state of SCell 230-*a* to an active state upon expiration of the timer, unless an active modem of SCell 230-*a* is already in an active state. In some examples, the timer configuration 255 may be signaled using RRC signaling, using a MAC-CE, or via other signaling. Thus, base station 105-*a*, UE 115-*a*, the XR device 215, or any combination thereof, may periodically switch SCell 230-*a* to a different state according to the timer. Base station 105-*a*, UE 115-*a*, or both, may reset the timer once the timer expires, such that the timer may loop around and continuously run.

In some examples, the scheduling information 245, the timer configuration 255, or both, may be based on signaling from UE 115-*a*, such as capability signaling or other signaling including power information 260. For example, the power information 260 may include a remaining battery power at UE 115-*a* (e.g., a percentage value or a low battery level indication), a batter charging status at UE 115-*a* (e.g., charging or not charging), or the like. Likewise, the XR device 215 may signal similar power information to base station 105-*a* (e.g., when the XR device 215 communicates directly with base station 105-*a*). Base station 105-*a* may learn a traffic periodicity, which may include the periodicity of the communication bursts, based on the power information 260 or based on receiving signaling from an application function (e.g., running at the XR device 215, UE 115-*a*, or both). For example, base station 105-*a* may implement a power saving algorithm based on one or more parameters. The parameters may include a value for how quickly a device (e.g., UE 115-*a*, the XR device 215, base station 105-*a*, or a combination thereof) may switch to a lower power state, how quickly the device may switch back to a high power state, or the like. Base station 105-*a* may tune the power saving algorithm based on the power information 260. In some examples, base station 105-*a* may use the communication burst periodicity or traffic periodicity to identify and signal the timer configuration 255, the scheduling information 245, or both, to UE 115-*a*. UE 115-*a* may relay the information or otherwise implement the information for communications via connection 220 based on an application running at the XR device 215. Base station 105-*a* may additionally or alternatively signal the timer configuration 255, the scheduling information 245, or both, directly to the XR device 215 via the wireless connection 225.

In some examples, base station 105-*a* may switch SCell 230-*a* to a dormant, or low-power state, based on one or more triggers. The triggers may be based on the timer configuration 255 (e.g., based on configuring a BWP-inactivity timer at UE 115-*a*, the XR device 215, or both), such that when the timer expires, base station 105-*a* performs a BWP switching or dormancy state switching operation for SCell 230-*a*. In some cases, the trigger may be based on base station 105-*a* determining the end of a communication burst when a higher layer buffer (e.g., a PDCP buffer) is empty. In some other cases, base station 105-*a* may determine the end of a communication burst by reading packet meta data embedded in packet headers. Base station 105-*a* may signal a BWP switch via control signaling, such as a DCI message, based on the trigger.

In some examples, base station 105-a, UE 115-a, the XR device 215, or any combination thereof, may implement the dormancy state switching as a power management technique for low-latency traffic, such as split XR LLPTC traffic. Such techniques may enable improved power savings while also maintaining a threshold latency for communications between devices.

Figure 3:
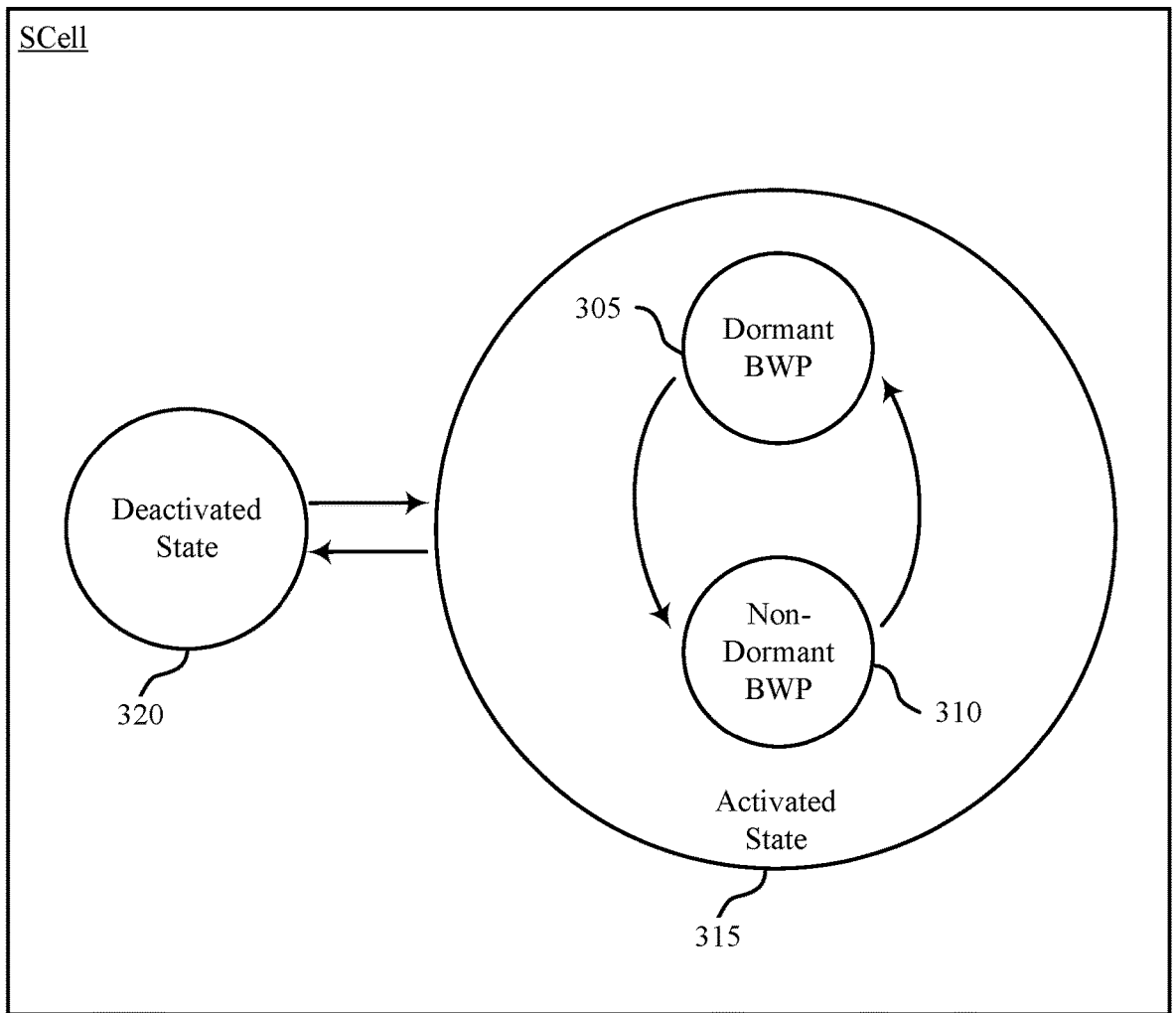
FIGS. 3 through 5 illustrate examples of dormancy state diagrams that support cell dormancy techniques for traffic in accordance with aspects of the present disclosure.

FIG. 3 illustrates an example of a dormancy state diagram 300 that supports cell dormancy techniques for traffic in accordance with aspects of the present disclosure. In some examples, the dormancy state diagram 300 may implement aspects of wireless communications system 100 and wireless communications system 200. For example, the dormancy state diagram 300 may be implemented by a UE 115, an XR device 215, and a base station 105 as described with reference to FIGS. 1 and 2. In some cases, a base station, a UE, or both, may perform a dormancy switching operation according to a dormancy pattern for an SCell 230. For example, the base station, the UE, or both, may switch between a dormant BWP 305 (e.g., inactive frequency resources) and a non-dormant BWP 310 (e.g., active frequency resources) according to the dormancy pattern.

In some cases, a base station may schedule communications (e.g., in an XR system), such as low-latency communications, for a UE over a PCell and one or more SCells 230. The UE may be operating in the XR system, where the XR system includes at least the UE and one or more XR devices. For example, the XR device may be tethered to the UE or the UE may have one or more XR capabilities. The base station may control a dormancy state at each SCell based on the communications at the SCell. In some examples, to reduce operating power at the XR device, the base station may switch the dormancy state of an SCell 230 within an activated state 315.

In some examples, the SCell 230 may be in a deactivated state 320 in which a carrier frequency for SCell 230 is not being used by one or more wireless devices, such as the base station, the UE, the XR device, or the like. The base station may activate the SCell 230 to communicate with the UE, the XR device, or both. While the SCell 230 is in the activated state 315, the UE, the XR device, or both, may transmit or receive signaling via one or more BWPs or may monitor one or more BWPs. The one or more BWPs may include active frequency resources for SCell 230 the base station is using to communicate on. However, the XR device may operate according to reduced power capabilities (e.g., due to thermal properties of one or more materials at the XR device, due to reduced functionality or battery size). Thus, the base station, the UE, or both, may switch to a dormant BWP 305 while SCell 230 is in the activated state 315 to further reduce power consumption. That is, the power consumption may be lower at the XR device if the SCell 230 switches to a dormant BWP than if the SCell 230 is operating using a non-dormant BWP 310.

In some cases, while using the dormant BWP 305, the SCell 230 may not be available for control channel monitoring (e.g., physical downlink control channel (PDCCH) monitoring), channel state information (CSI) measurements or reports (e.g., aperiodic-CSI (A-CSI), reference signal transmission (e.g., sounding reference signal (SRS) transmission), or the like. Once the base station, the UE, or both, switch the SCell 230 back to the non-dormant BWP 310, the SCell 230 may be available for monitoring and for signaling using one or more active frequency resources on the carrier frequency for SCell 230.

In some examples, the amount of time for the SCell 230 to switch between the dormant BWP 305 and the non-dormant BWP 310 (e.g., via DCI) may be reduced when compared to the SCell 230 switching between the activated state 315 and the deactivated state 320 (e.g., via a MAC-CE). Further, the BWP switching may facilitate more frequent adaptation to traffic load variations, such as for low-latency traffic (e.g., related to split computation XR, cloud gaming, or the like). The traffic load may vary for communication burst traffic, where the communications are exchanged during intervals or periodically. In some cases, the base station may dynamically configure the XR system (e.g., the UE, the XR device, or both) to perform the BWP switching for the SCell 230. For example, the base station may transmit a DCI message to the UE, and the UE may relay the information to the XR device or may implement the BWP switching for communications (e.g., low-latency communications) related to the XR device.

As described herein, wireless devices (e.g., a base station, a UE, an XR device, or the like) may use a cell dormancy pattern to switch between the dormant and non-dormant states. Specifically, the SCell 230 may switch dormancy states based on a UE or a base station identifying a pattern in a burst periodicity for low-latency communications. Here, the UE or base station may communicate low-latency power constrained communication bursts according to a periodicity. For example, the base station, which may implement multi-carrier communications that correspond to an SCell and PCell, may determine a periodicity of the communication bursts at the UE based on learning the traffic periodicity or receiving an indication of the traffic periodicity. The base station may configure the UE with a dormancy configuration for switching dormancy states (e.g., from dormant to non-dormant or non-dormant to dormant) at the SCell according to the periodicity. For example, the SCell may enter a dormant state during a period where the communication bursts are relatively infrequent or nonexistent. In some other examples, the SCell may enter a non-dormant state during a period where the communication bursts are relatively frequent. In some cases, switching dormancy states may involve the SCell switching to a dormant BWP of the SCell if entering a dormant state or a non-dormant BWP of the SCell if entering a non-dormant state. In some examples, the base station may configure the switching operation according to a timer, such that when the timer expires the SCell switches dormancy states.

Figure 4:
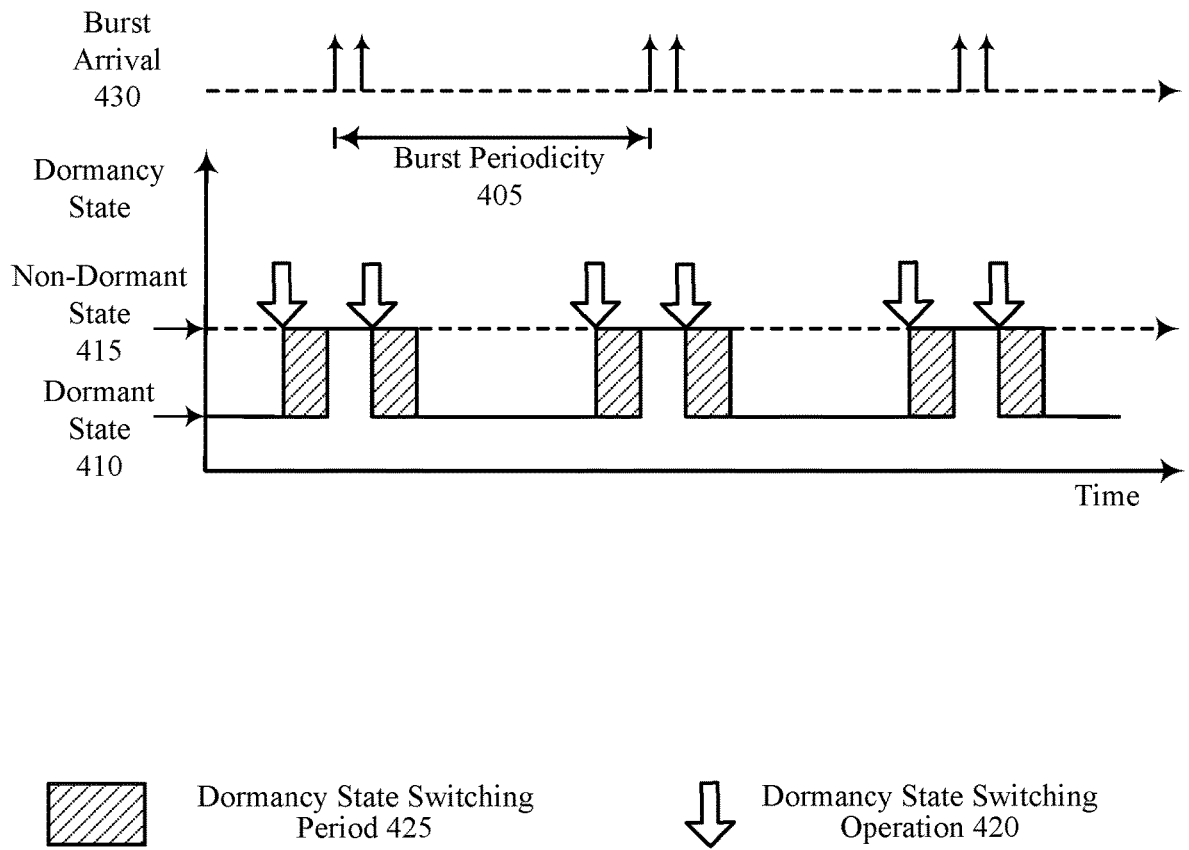

FIG. 4 illustrates an example of a dormancy state diagram 400 that supports cell dormancy techniques for traffic in accordance with aspects of the present disclosure. In some examples, the dormancy state diagram 400 may implement aspects of wireless communications system 100, wireless communications system 200, and dormancy state diagram 300. For example, the dormancy state diagram 400 may be implemented by a UE 115, an XR device 215, and a base station 105 as described with reference to FIGS. 1 and 2. In some cases, a base station, a UE, or both, may perform SCell dormancy switching according to a dormancy pattern (e.g., periods of dormant and non-dormant states, where each period may have some duration) and based on a burst periodicity 405. For example, the base station, the UE, or both, may switch between a dormant state 410 and a non-dormant state 415 according to the dormancy pattern.

In some cases, a base station may schedule communications in an XR system, such as low-latency communications, for a UE over a PCell and one or more SCells. The UE may be operating in the XR system, where the XR system includes the UE and an XR device. For example, the UE may be tethered to the XR device or may have one or more XR capabilities. The base station may, in some cases, control a dormancy state at each SCell via the PCell based on the communications at the SCell.

In some cases, the base station may initiate a dormancy state switching operation 420 for the SCell at the base station and the XR system (e.g., the UE, the XR device, or both). For example, the base station may perform BWP switching to switch between a dormant BWP and a non-dormant BWP, as described with reference to FIG. 3. The dormancy state switching operation 420 may occur during a dormancy state switching period 425 (e.g., some period of time for transitioning the SCell from the dormant state 410 to the non-dormant state 415 (e.g., an active state), and vice versa) according to a trigger, as described with reference to FIG. 2. For example, the trigger may be activated upon expiration of a timer, based on cross layer triggering, or a combination thereof. In some examples, the base station, the UE, or both, may perform a dormancy state switching operation 420 prior to burst arrival and after receiving the bursts. In some examples, the base station and the UE may communicate the bursts according to a burst periodicity 405.

The base station may determine the burst periodicity 405 based on a power algorithm or application level signaling for the UE, the XR device, or both. The base station may indicate the burst periodicity 405 to the UE in the form of scheduling information, a timer, or directly (e.g., in control signaling). In some examples, a pattern for the dormancy state switching operation 420 may be based on the burst periodicity 405. That is, the base station, the UE, or both, may perform the dormancy state switching operation 420 before and after each burst arrival 430 (e.g., switch the SCell to a non-dormant state 415 before the burst arrival 430 and to a dormant state 410 after the burst has arrived), which may happen according to the burst periodicity 405.

In some examples, the base station, the UE, or both, may switch between a non-dormant state 415 and a dormant state 410 for the SCell at the cadence of the burst arrival 430, where the bursts are LLPCT bursts. Additionally or alternatively, the base station, the UE, or both, may switch between the non-dormant state 415 and the dormant state 410 for the SCell at the cadence of the low-latency communication traffic grants (e.g., LLPCT traffic grants). In some cases, the non-dormant state 415 of the SCell corresponds to when the SCell is switched to a non-dormant BWP. In some other cases, the dormant state 410 for the SCell corresponds to when the SCell is switched to a dormant BWP.

Figure 5:
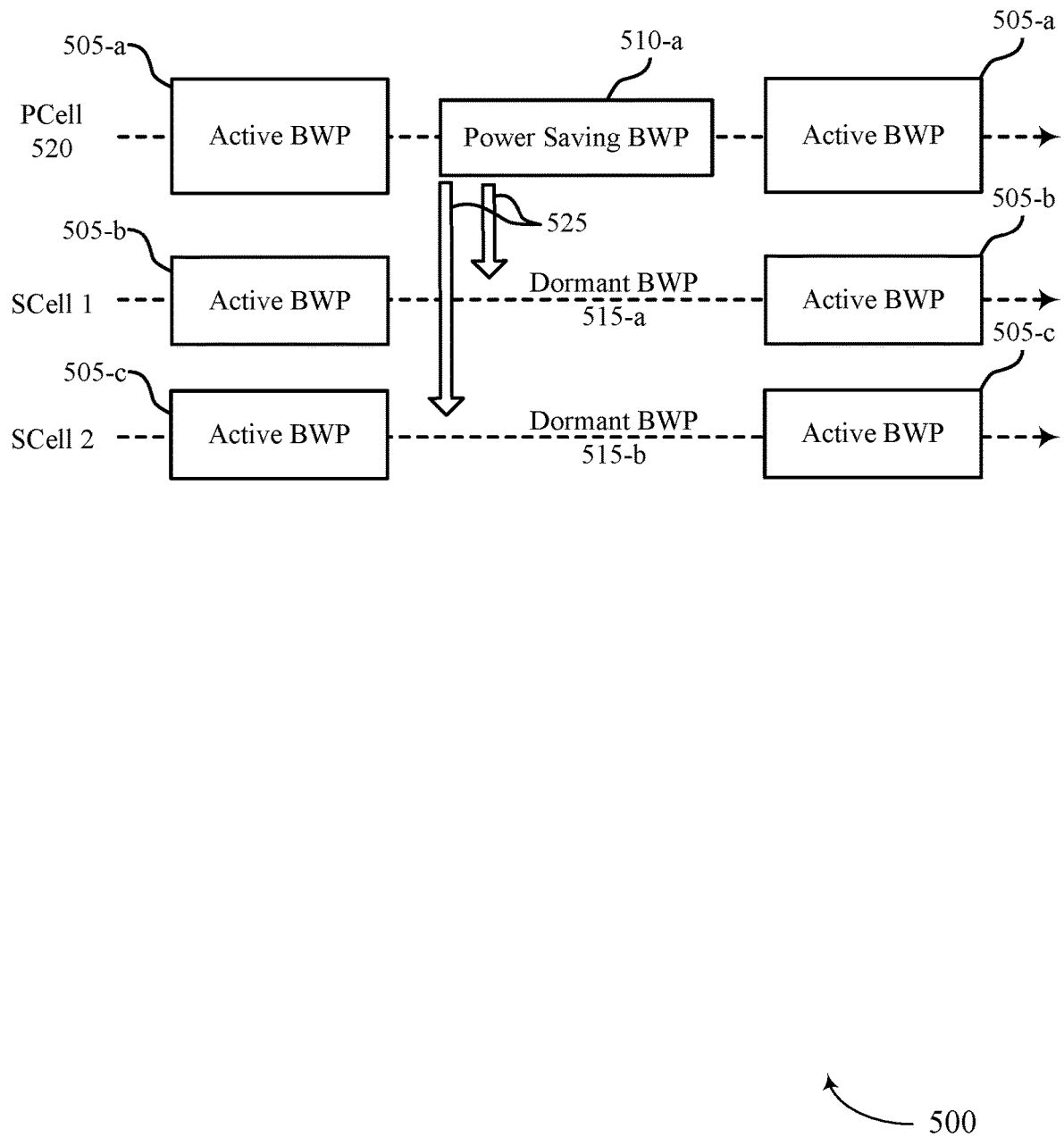

FIG. 5 illustrates an example of a dormancy state diagram 500 that supports cell dormancy techniques for traffic in accordance with aspects of the present disclosure. In some examples, the dormancy state diagram 400 may implement aspects of wireless communications system 100, wireless communications system 200, dormancy state diagram 300, and dormancy state diagram 400. For example, the dormancy state diagram 500 may be implemented by a UE 115, an XR device 215, and a base station 105 as described with reference to FIGS. 1 and 2. In some cases, a base station, a UE, an XR device, or any combination thereof, may perform SCell dormancy switching according to a dormancy pattern, which may include switching BWPs. For example, the base station, the UE, or both, may switch between an active BWP 505 (e.g., a non-dormant BWP 310 as described with reference to FIG. 3) and a power saving BWP 510 or a dormant BWP 515 (e.g., a dormant BWP 515-a, a dormant BWP 515-b) according to the dormancy pattern.

In some cases, a base station may schedule communications (e.g., in an XR system), such as low-latency communications, for a UE over a PCell 520 and one or more secondary cells SCells, such as SCell 1 and SCell 2, as illustrated in FIG. 5. The UE may be operating in the XR system, where the XR system includes the UE and an XR device. For example, the UE may be tethered to the XR device or may have one or more XR capabilities. The base station may control a dormancy state at each SCell via the PCell 520 based on the communications at the SCell.

In some cases, the base station may initiate a dormancy state switching operation for SCell 1 and SCell 2 at the base station and the XR system (e.g., the UE, the XR device, or both). For example, the base station may perform BWP switching to switch between a dormant BWP and an active BWP, (e.g., a dormant BWP 305 and an active BWP 310, respectively, as described with reference to FIG. 3).

In some examples, the base station, the UE, or both, may use a power-saving BWP 510, such as power saving BWP 510-a, and an SCell dormancy switching operation together. For example, the base station, the UE, or both, may determine to enter a low-power state (e.g., to reduce power consumption to save battery power or reduce thermal conduction at the XR device, the UE, or both). For example, a PCell 520 may switch from active BWP 505-a to power saving BWP 510-a for a duration. Switching from the active BWP 505-a to the power saving BWP 510-a may correspond to a cell switching pattern, as described herein. For instance, in addition (or as an alternative to) switching one or more SCells (e.g., SCell 1, SCell 2) between an active state and a dormant state based on a communication burst periodicity, a base station and UE may switch the BWP associated with the PCell from the active BWP 505-a to the power saving BWP 510-a. The switch to the power saving BWP 510-a associated with the PCell 520 may occur between bursts of communications. Likewise, the PCell 520 may switch from the power saving BWP 510-a to the active BWP 505-a when a burst is to be communicated (e.g., based on some periodicity). In some examples, switching between the active BWP 505-a and the power saving BWP 510-a (and vice versa) may be performed at the same time the one or more SCells are switched between a dormant and active state, or may occur at different times.

In some examples, signaling received on the PCell 520 may indicate a switch of a dormancy state for SCell 1 and SCell 2. That is signaling 525 (e.g., DCI received via the PCell 520) may indicate a BWP switch (and dormancy state switch) for the one or more SCells. Here, SCell 1 may switch from active BWP 505-a to dormant BWP 515-a based on the signaling 525. Similarly, SCell 2 may switch from active BWP 505-c to dormant BWP 515-b based on the signaling 525.

In some examples, the PCell 520 may switch back to active BWP 505-a after a duration, which may be based on the cell dormancy pattern and the burst periodicity. SCell 1 may switch back to active BWP 505-b, and SCell 2 may switch back to active BWP 505-c based on the PCell 520 switching back to a high-power state (e.g., to receive one or more communication bursts). In some examples, the configuration for power-saving BWP 510-a may be suitable for little to no traffic and may include a reduced control channel (e.g., PDCCH) monitoring periodicity. The bandwidth of a power saving BWP 510 may be reduced or narrow when compared with an active BWP 505. The configuration for an active BWP 505 may indicate a per-slot control channel (e.g., PDCCH) monitoring and may have a reduced or wider bandwidth when compared with the power saving BWP 510.

Figure 6:
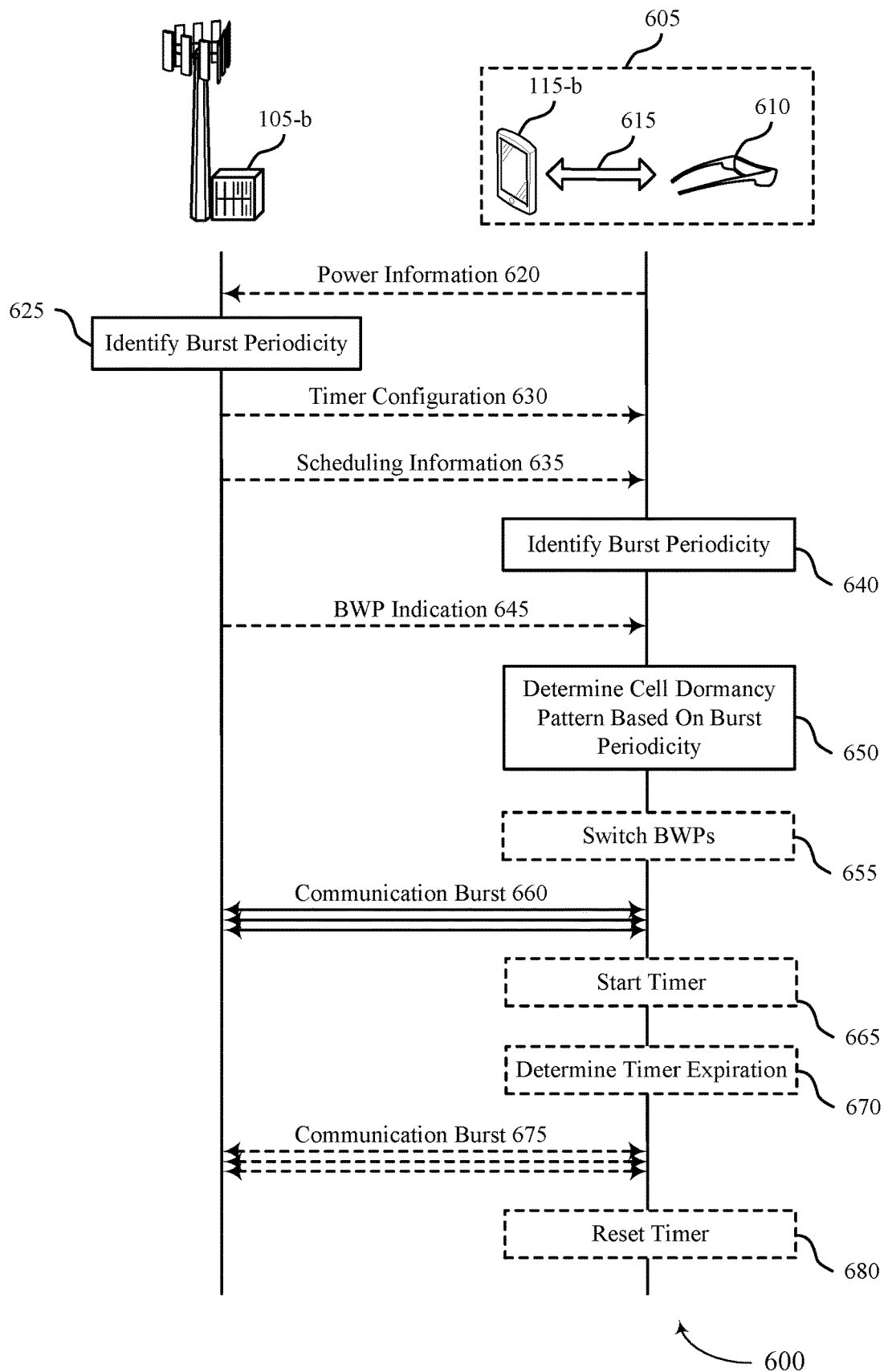
FIG. 6 illustrates an example of a process flow in a system that supports cell dormancy techniques for traffic in accordance with aspects of the present disclosure.

FIG. 6 illustrates an example of a process flow 600 in a system that supports cell dormancy techniques for traffic in accordance with aspects of the present disclosure. In some examples, process flow 600 may implement aspects of wireless communications system 100, wireless communications system 200, and dormancy state diagram 300 through dormancy state diagram 500. The process flow 600 may illustrate an example of UE 115-*b* and base station 105-*b* identifying a burst periodicity and performing a dormancy switching operation for an SCell based on the burst periodicity. Alternative examples of the following may be implemented, where some processes are performed in a different order than described or are not performed. In some cases, processes may include additional features not mentioned below, or further processes may be added.

In some cases, base station 105-*b* may schedule communications, such as low-latency communications (e.g., communications with a latency requirement below some threshold), for UE 115-*b* over a PCell and one or more secondary cells SCells. UE 115-*b* may be operating in an XR system 605, where the XR system 605 may include at least UE 115-*b* and an XR device 610 (e.g., an XR device 215 as described with reference to FIG. 2). For example, UE 115-*b* may be tethered to the XR device 610 via a link 615 (e.g., a wired link, a wireless link), or UE 115-*b* may have one or more XR capabilities, or any combination thereof. In some cases, UE 115-*b* may operate according to one or more capabilities associated with a VR system, an AR system, a mixed reality system, a cloud gaming system, or a combination thereof.

At 620, UE 115-*b* may transmit power information to base station 105-*b*. For example, UE 115-*b* may transmit a value of remaining battery power at UE 115-*b* to base station 105-*b*. Additionally or alternatively, UE 115-*b* may transmit a charging status of UE 115-*b* to base station 105-*b*. The charging status may include an active charge status, an idle charge status, or an inactive charge status.

At 625, base station 105-*b* may identify a burst periodicity associated with a bursts of communications between base station 105-*b* and UE 115-*b*. The communications may be low-latency communications related to a reduced power capability of the XR device 610 (e.g., with a latency value below a threshold). In some examples, the bursts may be communicated over a PCell and one or more SCells in accordance with a multi-cell communications scheme.

At 630, UE 115-*b* may receive an indication of a timer configuration from base station 105-*b*. The timer configuration may include a timer associated with a cell dormancy pattern for switching dormancy states to receive the communication bursts.

At 635, UE 115-*b* may receive control signaling (e.g., a DCI message, a MAC-CE, RRC signaling, or the like) including scheduling information. The scheduling information may indicate the burst periodicity, one or more scheduling grants for the communication bursts, or both.

At 640, UE 115-*b* may identify the burst periodicity. In some examples, base station 105-*b* may indicate the burst periodicity to UE 115-*b*. For example, the burst periodicity may be based on the power information (e.g., determined at base station 105-*b*), the timer configuration, the scheduling information, or a combination thereof. Additionally or alternatively, UE 115-*b* may determine the burst periodicity independent of base station 105-*b* (e.g., based on one or more predetermined values at UE 115-*b*).

At 645, base station 105-*b* may transmit downlink control signaling (e.g., a DCI message) indicating a BWP that has a bandwidth for the dormant state of the one or more SCells.

At 650, UE 115-*b* may determine the cell dormancy pattern for switching the one or more SCells between an active state, or non-dormant state, and a dormant state. In some examples, the non-dormant state and the dormant state may be sub-states within an active state of the SCell. The cell dormancy pattern may be based on the burst periodicity.

At 655, base station 105-*b*, UE 115-*b*, or both, may switch between a BWP with a bandwidth for the active state of the one or more SCells and the BWP indicated at 645 based on the downlink control signaling and the cell dormancy pattern. The bandwidth for the active state may be greater than the bandwidth for the BWP indicated at 645. In some examples, UE 115-*b* may modify a parameter value (e.g., a K0 value) corresponding to a slot offset between a scheduling grant and data reception on the PCell based on switching BWPs of the PCell (e.g., based on switching to a power saving BWP). Additionally or alternatively, the UE 115-*b* may modify a downlink control monitoring periodicity on the PCell based on switching BWPs of the PCell.

At 660, UE 115-*b* and base station 105-*b* may communicate bursts based on switching the one or more SCells between the active state to the dormant state using the cell dormancy pattern. For example, UE 115-*b* may transmit, and base station 105-*b* may receive, one or more communication bursts. Additionally or alternatively, base station 105-*b* may transmit, and UE 115-*b* may receive, one or more communication bursts. In some examples, each communication burst may be communicated while the one or more SCells are in the active state. In some examples, UE 115-*b* and base station 105-*b* may communicate the bursts based on the timer configuration. In some examples, UE 115-*b* and base station 105-*b* may switch the one or more SCells to the active state using the cell dormancy pattern based on an availability of traffic associated with the communications.

In some examples, UE 115-*b* may operate in a BWP with an initial bandwidth for the PCell when communicating each burst and may switch to another BWP with a bandwidth less than the initial bandwidth. UE 115-*b* may switch BWPs based on the burst periodicity and according to the cell dormancy pattern (e.g., when the one or more SCells switches dormancy states).

In some cases, UE 115-*b* may operate in an active BWP for each SCell when communicating each burst and may switch to a dormant BWP based on the burst periodicity (e.g., after communicating the burst at 660). In some examples, the dormant BWP may have a bandwidth less than the bandwidth of the active BWP.

At 665, UE 115-*b* may start the timer when communicating a burst (e.g., the timer may be started at a beginning of each burst). At 670, base station 105-*b*, UE 115-*b*, or both, may determine that the timer has expired after a duration based on the timer configuration. Base station 105-*b* and UE 115-*b* may communicate bursts at 675 based on the timer expiring, where the bursts are communicated based on the one or more SCells switching to the active state. In some cases, transitioning out of an SCell dormancy state (e.g., into the active state, into the non-dormant state) may correspond to an expiration of the timer. In some examples, once the timer has expired at 680, UE 115-*b* may reset the timer according to the timer configuration based on determining that the timer has expired.

Figure 7:
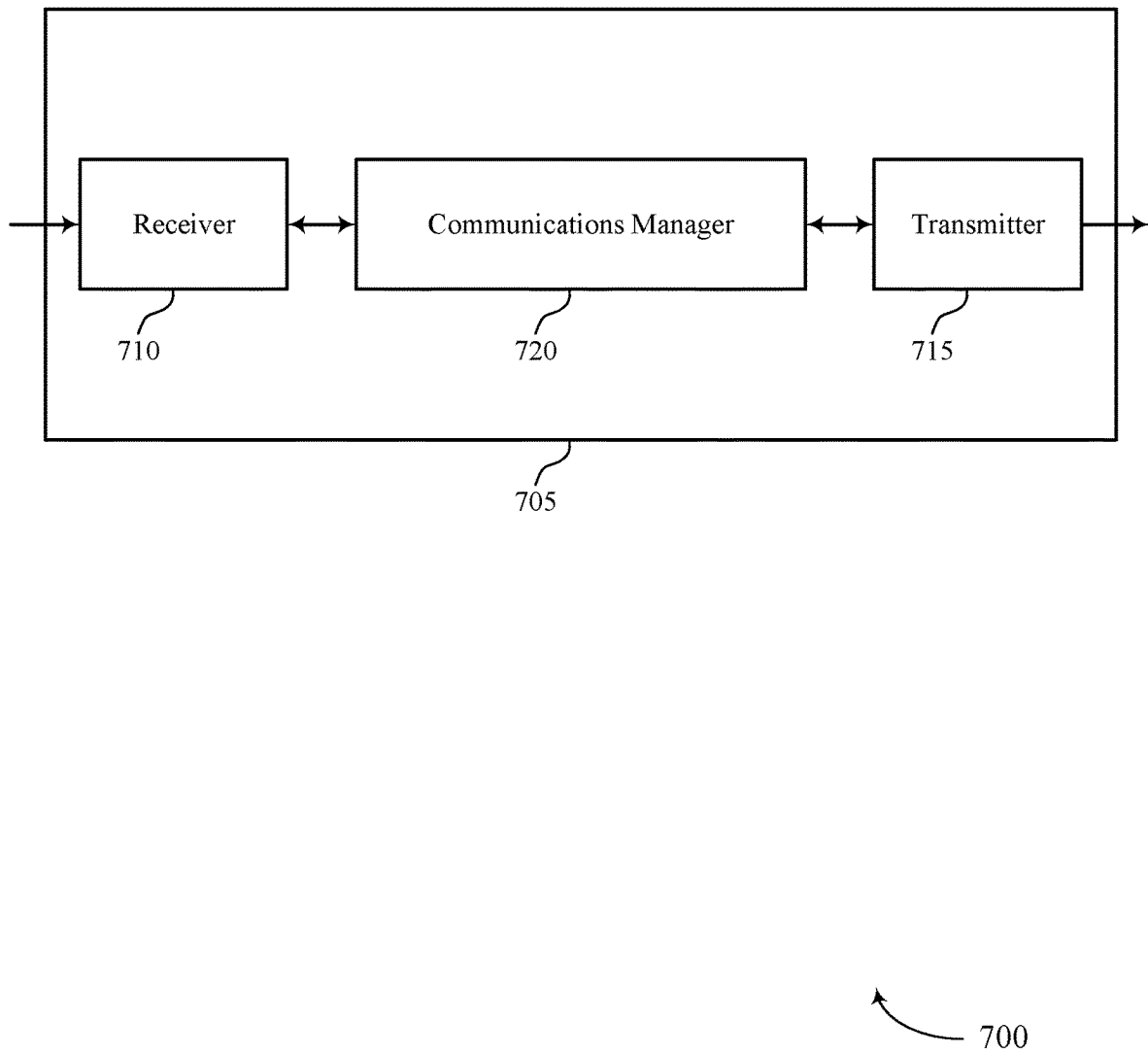
FIGS. 7 and 8 show block diagrams of devices that support cell dormancy techniques for traffic in accordance with aspects of the present disclosure.

FIG. 7 shows a block diagram 700 of a device 705 that supports cell dormancy techniques for traffic in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to cell dormancy techniques for traffic). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to cell dormancy techniques for traffic). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of cell dormancy techniques for traffic as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both, to receive information, transmit information, or perform various other operations as described herein.

The communications manager 720 may support wireless communications at a UE in accordance with examples as disclosed herein. For example, the communications manager 720 may be configured as or otherwise support a means for identifying a burst periodicity associated with a set of multiple bursts of communications between the UE and a base station, where the set of multiple bursts are communicated over a PCell and one or more SCells in accordance with a multi-carrier communications scheme. The communications manager 720 may be configured as or otherwise support a means for determining a cell dormancy pattern for switching the one or more SCells between an active state and a dormant state, where the cell dormancy pattern is based on the identified burst periodicity. The communications manager 720 may be configured as or otherwise support a means for communicating (e.g., transmitting, receiving) the set of multiple bursts based on switching the one or more SCells between the active state to the dormant state using the cell dormancy pattern, where each burst of the set of multiple bursts is communicated while the one or more SCells are in the active state.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for a UE and a base station to switch dormancy states of a cell for a carrier frequency (e.g., a secondary cell (SCell) in communication with a primary cell (PCell)) based on a communication burst periodicity, which may reduce processing, reduce power consumption, cause more efficient utilization of communication resources, and the like.

Figure 8:
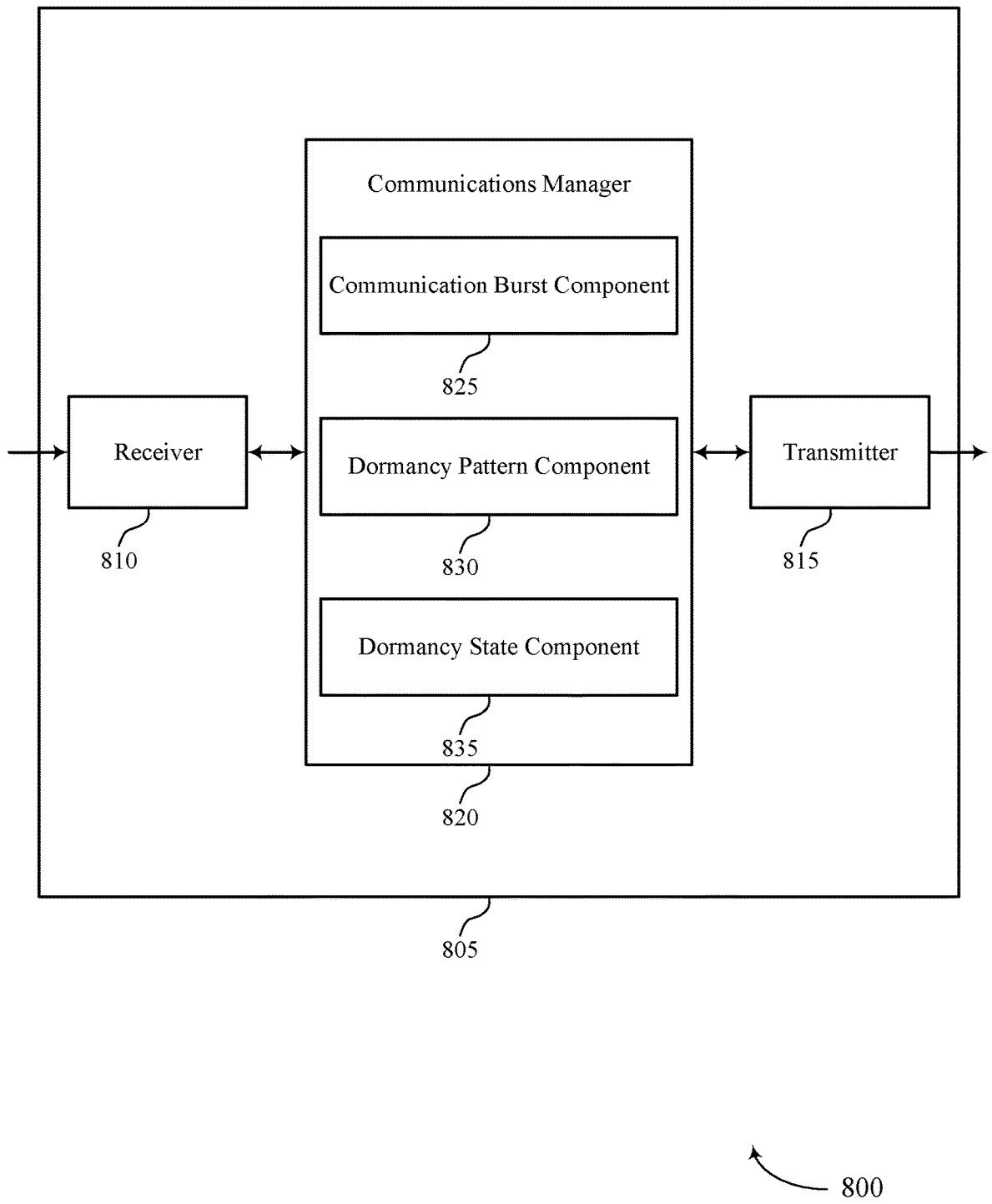

FIG. 8 shows a block diagram 800 of a device 805 that supports cell dormancy techniques for traffic in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to cell dormancy techniques for traffic). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to cell dormancy techniques for traffic). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of cell dormancy techniques for traffic as described herein. For example, the communications manager 820 may include a communication burst component 825, a dormancy pattern component 830, a dormancy state component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both, to receive information, transmit information, or perform various other operations as described herein.

The communications manager 820 may support wireless communications at a UE in accordance with examples as disclosed herein. The communication burst component 825 may be configured as or otherwise support a means for identifying a burst periodicity associated with a set of multiple bursts of communications between the UE and a base station, where the set of multiple bursts are communicated over a PCell and one or more SCells in accordance with a multi-carrier communications scheme. The dormancy pattern component 830 may be configured as or otherwise support a means for determining a cell dormancy pattern for switching the one or more SCells between an active state and a dormant state, where the cell dormancy pattern is based on the identified burst periodicity. The dormancy state component 835 may be configured as or otherwise support a means for communicating (e.g., transmitting, receiving) the set of multiple bursts based on switching the one or more SCells between the active state to the dormant state using the cell dormancy pattern, where each burst of the set of multiple bursts is communicated while the one or more SCells are in the active state.

Figure 9:
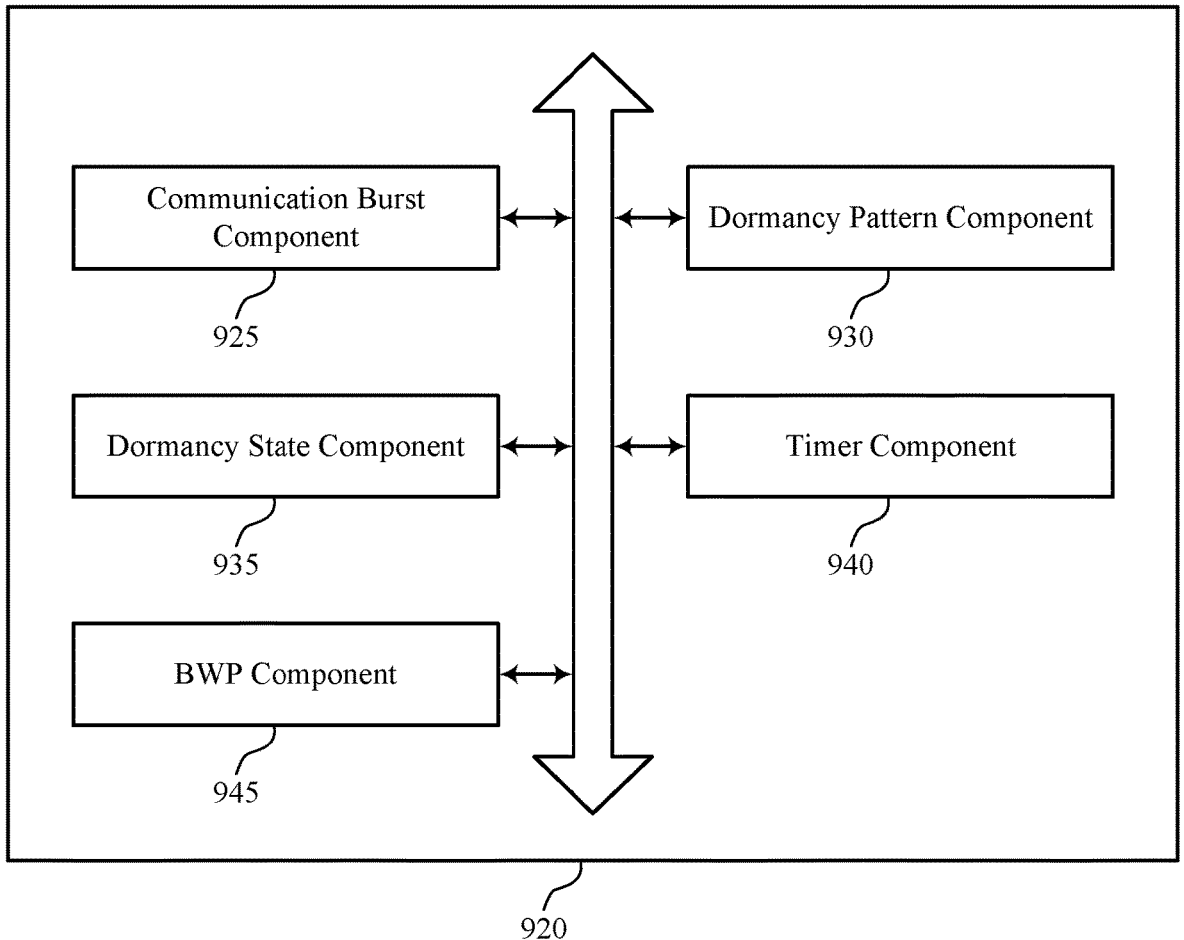
FIG. 9 shows a block diagram of a communications manager that supports cell dormancy techniques for traffic in accordance with aspects of the present disclosure.

FIG. 9 shows a block diagram 900 of a communications manager 920 that supports cell dormancy techniques for traffic in accordance with aspects of the present disclosure. The communications manager 920 may be an example of aspects of a communications manager 720, a communications manager 820, or both, as described herein. The communications manager 920, or various components thereof, may be an example of means for performing various aspects of cell dormancy techniques for traffic as described herein. For example, the communications manager 920 may include a communication burst component 925, a dormancy pattern component 930, a dormancy state component 935, a timer component 940, a BWP component 945, or any combination thereof. Each of these components may communicate, directly or indirectly, with one another (e.g., via one or more buses).

The communications manager 920 may support wireless communications at a UE in accordance with examples as disclosed herein. The communication burst component 925 may be configured as or otherwise support a means for identifying a burst periodicity associated with a set of multiple bursts of communications between the UE and a base station, where the set of multiple bursts are communicated over a PCell and one or more SCells in accordance with a multi-carrier communications scheme. The dormancy pattern component 930 may be configured as or otherwise support a means for determining a cell dormancy pattern for switching the one or more SCells between an active state and a dormant state, where the cell dormancy pattern is based on the identified burst periodicity. The dormancy state component 935 may be configured as or otherwise support a means for communicating (e.g., transmitting, receiving) the set of multiple bursts based on switching the one or more SCells between the active state to the dormant state using the cell dormancy pattern, where each burst of the set of multiple bursts is communicated while the one or more SCells are in the active state.

In some examples, the timer component 940 may be configured as or otherwise support a means for receiving, from the base station, an indication of a timer configuration for a timer associated with the cell dormancy pattern, where the set of multiple bursts are communicated based on the timer configuration. In some examples, the timer component 940 may be configured as or otherwise support a means for starting the timer at a first time corresponding to arrival of a first burst of the set of multiple bursts. In some examples, the timer component 940 may be configured as or otherwise support a means for determining that the timer has expired at a second time after the first time based on the timer configuration, where a second burst of the set of multiple bursts is communicated based at least in part on the timer expiring, and where the second burst is communicated based at least in part on the one or more SCells switching to the active state. In some examples, the timer component 940 may be configured as or otherwise support a means for resetting the timer according to the timer configuration based on determining that the timer has expired. In some examples, switching the one or more SCells to the active state using the cell dormancy pattern is based on an availability of traffic associated with the communications.

In some examples, the BWP component 945 may be configured as or otherwise support a means for operating in a first BWP for the PCell when communicating the one or more SCells are in the active state, the first BWP having a first bandwidth. In some examples, the BWP component 945 may be configured as or otherwise support a means for switching to a second BWP for the PCell based on the burst periodicity, the second BWP having a second bandwidth that is less than the first bandwidth, where switching to the second BWP corresponds to a duration for switching the one or more SCells to the dormant state using the cell dormancy pattern. In some examples, the BWP component 945 may be configured as or otherwise support a means for modifying a downlink control monitoring periodicity on the PCell based on switching to the second BWP of the PCell. In some examples, the BWP component 945 may be configured as or otherwise support a means for modifying a parameter value corresponding to a slot offset between a scheduling grant and data reception on the PCell based on switching to the second BWP of the PCell.

In some examples, the BWP component 945 may be configured as or otherwise support a means for operating in an active BWP for each SCell of the one or more SCells when communicating each burst of the set of multiple bursts, the active BWP having a first bandwidth. In some examples, the BWP component 945 may be configured as or otherwise support a means for switching to a dormant BWP for the each SCell of the one or more SCells based on an inactivity timer, the dormant BWP having a second bandwidth that is less than the first bandwidth, where switching to the dormant BWP corresponds to switching the one or more SCells to the dormant state using the cell dormancy pattern.

In some examples, to support identifying the burst periodicity, the communication burst component 925 may be configured as or otherwise support a means for receiving scheduling information indicating at least one of the burst periodicity or one or more scheduling grants for the set of multiple bursts of the communications. In some examples, to support identifying the burst periodicity, the communication burst component 925 may be configured as or otherwise support a means for identifying the burst periodicity based on the scheduling information.

In some examples, the BWP component 945 may be configured as or otherwise support a means for receiving, from the base station, downlink control signaling indicating a switch to a dormant BWP for the communications, where the downlink control signaling is triggered by a PDCP buffer status corresponding to empty. In some examples, the BWP component 945 may be configured as or otherwise support a means for switching from a second BWP to the first BWP based on the downlink control signaling, where the second BWP has a second bandwidth that is greater than the first bandwidth and is associated with the active state of the one or more SCells, and where switching from the second BWP to the first BWP corresponds to the cell dormancy pattern.

In some examples, the dormancy pattern component 930 may be configured as or otherwise support a means for transmitting, to the base station, a value of remaining battery power at the UE, where one or more parameters associated with the cell dormancy pattern is based on the value of remaining battery power. In some examples, the dormancy pattern component 930 may be configured as or otherwise support a means for transmitting, to the base station, a charging status of the UE, where one or more parameters associated with the cell dormancy pattern is based on the charging status. In some examples, the charging status includes at least one of an active charge status, an idle charge status, or an inactive charge status.

In some examples, the UE is operating according to one or more capabilities associated with a VR system, an AR system, a mixed reality system, a cloud gaming system, or a combination thereof.

Figure 10:
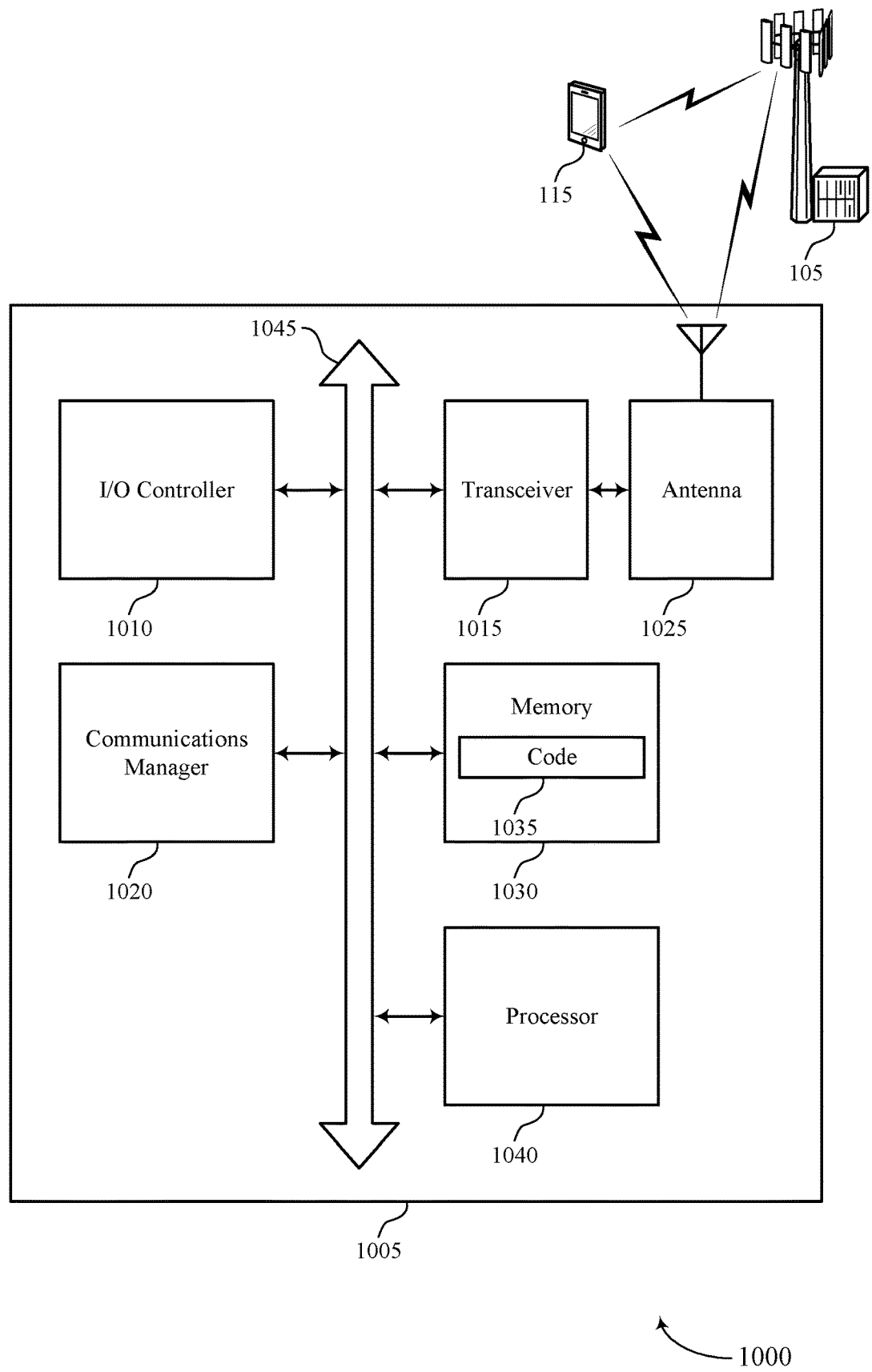
FIG. 10 shows a diagram of a system including a device that supports cell dormancy techniques for traffic in accordance with aspects of the present disclosure.

FIG. 10 shows a diagram of a system 1000 including a device 1005 that supports cell dormancy techniques for traffic in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting cell dormancy techniques for traffic). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for identifying a burst periodicity associated with a set of multiple bursts of communications between the UE and a base station, where the set of multiple bursts are communicated over a PCell and one or more SCells in accordance with a multi-carrier communications scheme. The communications manager 1020 may be configured as or otherwise support a means for determining a cell dormancy pattern for switching the one or more SCells between an active state and a dormant state, where the cell dormancy pattern is based on the identified burst periodicity. The communications manager 1020 may be configured as or otherwise support a means for communicating (e.g., transmitting, receiving) the set of multiple bursts based on switching the one or more SCells between the active state to the dormant state using the cell dormancy pattern, where each burst of the set of multiple bursts is communicated while the one or more SCells are in the active state.

By including or configuring the communications manager 1020 in accordance with examples as described herein, the device 1005 may support techniques for a UE and a base station to switch dormancy states of a cell for a carrier frequency (e.g., a secondary cell (SCell) in communication with a primary cell (PCell)) based on a communication burst periodicity, which may improve communication reliability, reduce latency, improve user experience related to reduced processing, reduce power consumption, cause more efficient utilization of communication resources, improve coordination between devices, increase battery life, improve utilization of processing capability, or the like.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of cell dormancy techniques for traffic as described herein, or the processor 1040 and the memory 1030 may be otherwise configured to perform or support such operations.

Figure 11:
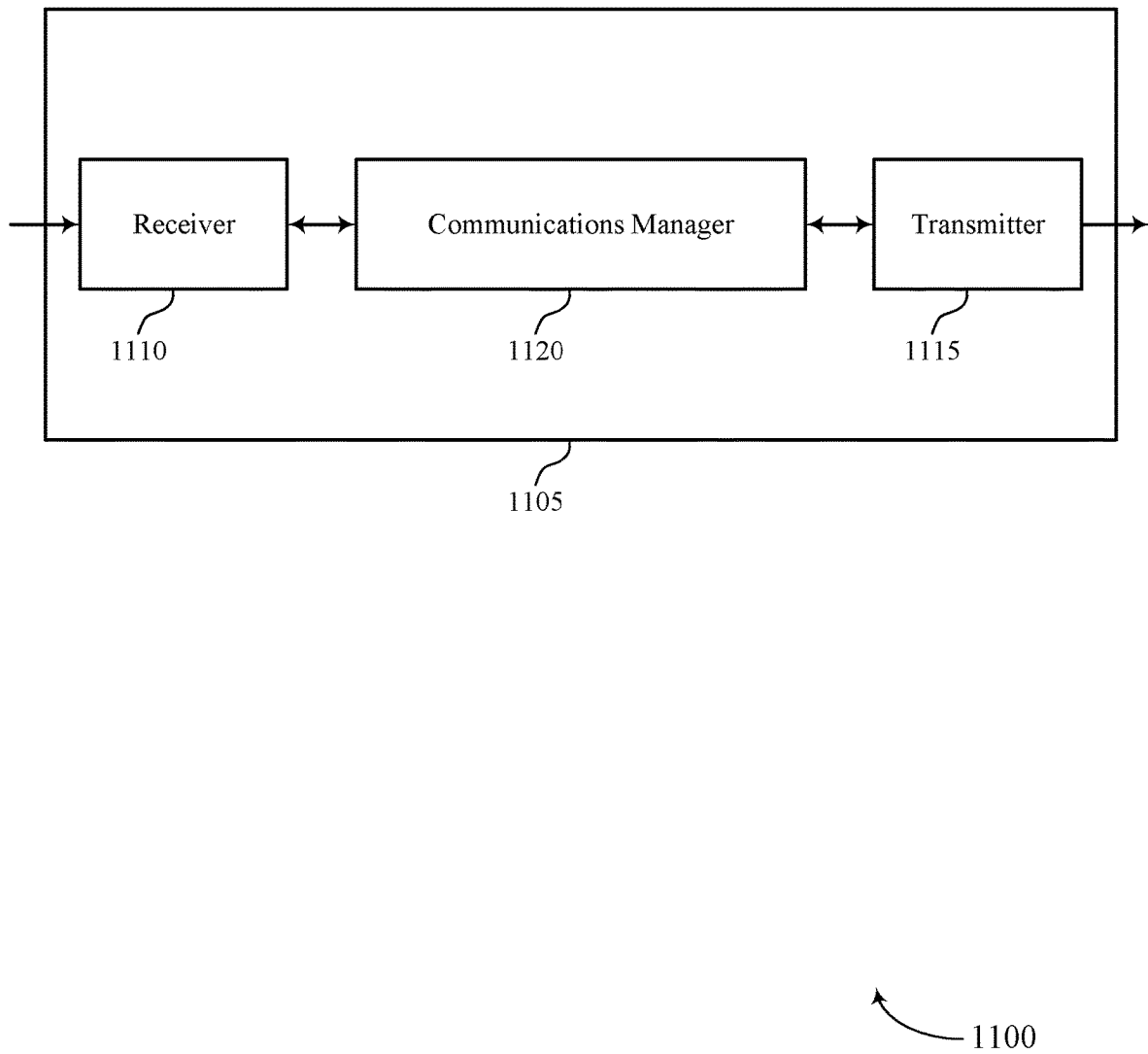
FIGS. 11 and 12 show block diagrams of devices that support cell dormancy techniques for traffic in accordance with aspects of the present disclosure.

FIG. 11 shows a block diagram 1100 of a device 1105 that supports cell dormancy techniques for traffic in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to cell dormancy techniques for traffic). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to cell dormancy techniques for traffic). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of cell dormancy techniques for traffic as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both, to receive information, transmit information, or perform various other operations as described herein.

The communications manager 1120 may support wireless communications at a base station in accordance with examples as disclosed herein. For example, the communications manager 1120 may be configured as or otherwise support a means for identifying a burst periodicity associated with a set of multiple bursts of communications between the base station and a UE, where the set of multiple bursts are communicated over a PCell and one or more SCells in accordance with a multi-cell communications scheme. The communications manager 1120 may be configured as or otherwise support a means for configuring a cell dormancy pattern for switching the one or more SCells between an active state and a dormant state, where the cell dormancy pattern is based on the identified burst periodicity. The communications manager 1120 may be configured as or otherwise support a means for communicating (e.g., transmitting, receiving) the set of multiple bursts of the communications based on switching the one or more SCells between the active state to the dormant state using the cell dormancy pattern, where each burst of the set of multiple bursts is communicated while the one or more SCells are in the active state.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for a UE and a base station to switch dormancy states of a cell for a carrier frequency (e.g., a secondary cell (SCell) in communication with a primary cell (PCell)) based on a communication burst periodicity, which may reduce processing, reduce power consumption, cause more efficient utilization of communication resources, and the like.

Figure 12:
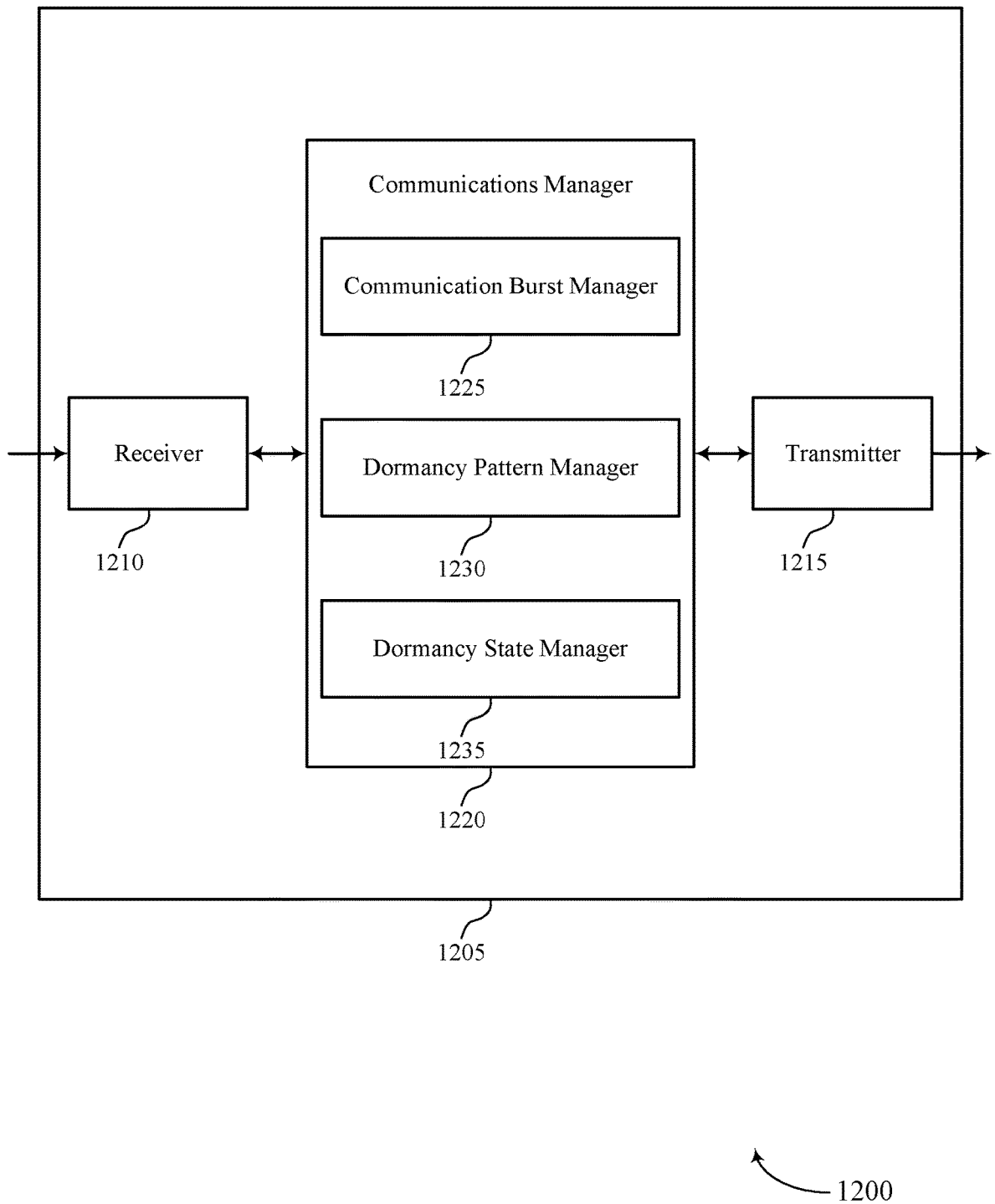

FIG. 12 shows a block diagram 1200 of a device 1205 that supports cell dormancy techniques for traffic in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to cell dormancy techniques for traffic). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to cell dormancy techniques for traffic). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of cell dormancy techniques for traffic as described herein. For example, the communications manager 1220 may include a communication burst manager 1225, a dormancy pattern manager 1230, a dormancy state manager 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both, to receive information, transmit information, or perform various other operations as described herein.

The communications manager 1220 may support wireless communications at a base station in accordance with examples as disclosed herein. The communication burst manager 1225 may be configured as or otherwise support a means for identifying a burst periodicity associated with a set of multiple bursts of communications between the base station and a UE, where the set of multiple bursts are communicated over a PCell and one or more SCells in accordance with a multi-cell communications scheme. The dormancy pattern manager 1230 may be configured as or otherwise support a means for configuring a cell dormancy pattern for switching the one or more SCells between an active state and a dormant state, where the cell dormancy pattern is based on the identified burst periodicity. The dormancy state manager 1235 may be configured as or otherwise support a means for communicating (e.g., transmitting, receiving) the set of multiple bursts of the communications based on switching the one or more SCells between the active state to the dormant state using the cell dormancy pattern, where each burst of the set of multiple bursts is communicated while the one or more SCells are in the active state.

Figure 13:
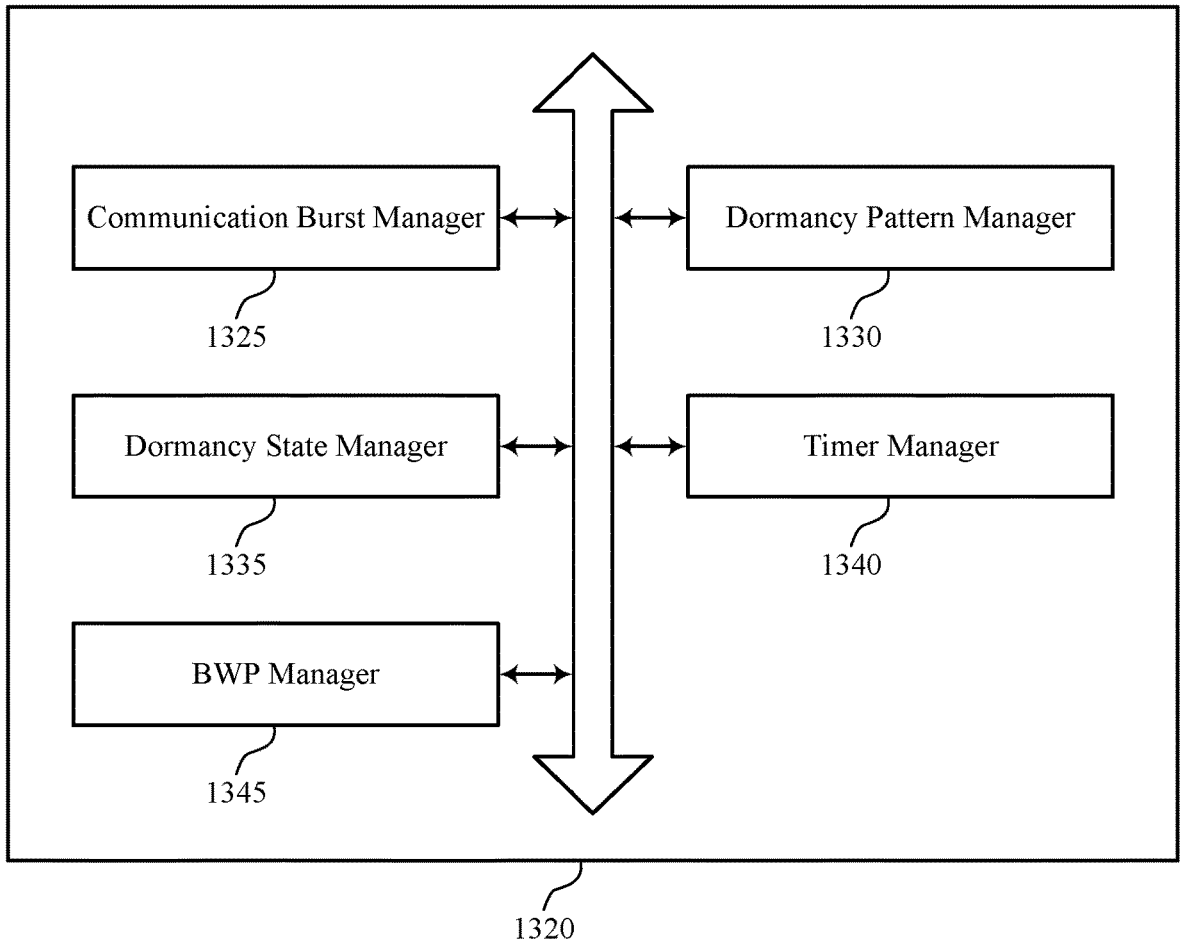
FIG. 13 shows a block diagram of a communications manager that supports cell dormancy techniques for traffic in accordance with aspects of the present disclosure.

FIG. 13 shows a block diagram 1300 of a communications manager 1320 that supports cell dormancy techniques for traffic in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of cell dormancy techniques for traffic as described herein. For example, the communications manager 1320 may include a communication burst manager 1325, a dormancy pattern manager 1330, a dormancy state manager 1335, a timer manager 1340, a BWP manager 1345, or any combination thereof. Each of these components may communicate, directly or indirectly, with one another (e.g., via one or more buses).

The communications manager 1320 may support wireless communications at a base station in accordance with examples as disclosed herein. The communication burst manager 1325 may be configured as or otherwise support a means for identifying a burst periodicity associated with a set of multiple bursts of communications between the base station and a UE, where the set of multiple bursts are communicated over a PCell and one or more SCells in accordance with a multi-cell communications scheme. The dormancy pattern manager 1330 may be configured as or otherwise support a means for configuring a cell dormancy pattern for switching the one or more SCells between an active state and a dormant state, where the cell dormancy pattern is based on the identified burst periodicity. The dormancy state manager 1335 may be configured as or otherwise support a means for communicating the set of multiple bursts of the communications based on switching the one or more SCells between the active state to the dormant state using the cell dormancy pattern, where each burst of the set of multiple bursts is communicated while the one or more SCells are in the active state.

In some examples, the timer manager 1340 may be configured as or otherwise support a means for determining a timer configuration for an inactivity timer associated with the cell dormancy pattern based on the burst periodicity. In some examples, the timer manager 1340 may be configured as or otherwise support a means for transmitting, to the UE, an indication of the timer configuration, where the set of multiple bursts are communicated based on the timer configuration, and where the inactivity timer corresponds to the one or more SCells being in the dormant state.

In some examples, the communication burst manager 1325 may be configured as or otherwise support a means for determining that an application layer is preparing for at least one burst of the set of multiple bursts, where switching the one or more SCells to the active state using the cell dormancy pattern is based on the application layer preparing for the at least one burst.

In some examples, to support identifying the burst periodicity, the communication burst manager 1325 may be configured as or otherwise support a means for determining a buffer status of a packet data convergence protocol buffer. In some examples, to support identifying the burst periodicity, the communication burst manager 1325 may be configured as or otherwise support a means for identifying the burst periodicity based on the buffer status including an empty status.

In some examples, the BWP manager 1345 may be configured as or otherwise support a means for transmitting, to the UE and based on the buffer status including the empty status, downlink control signaling indicating a switch from a first BWP (e.g., an active BWP) to a second BWP (e.g., a dormant BWP). In some examples, the first BWP may have a first bandwidth that is different than (e.g., greater than) a second bandwidth of the second BWP, and where the second BWP is associated with the dormant state of the one or more SCells.

In some examples, to support identifying the burst periodicity, the communication burst manager 1325 may be configured as or otherwise support a means for identifying a set of metadata associated with the communications based on reading one or more packet headers of the communications. In some examples, to support identifying the burst periodicity, the communication burst manager 1325 may be configured as or otherwise support a means for identifying the burst periodicity based on the set of metadata.

In some examples, the BWP manager 1345 may be configured as or otherwise support a means for transmitting, to the UE and based on the set of metadata, downlink control signaling indicating a switch from first BWP to a second BWP, where the first BWP has a first bandwidth that is greater than a second bandwidth of the second BWP, and where the second BWP is associated with the dormant state of the one or more SCells.

In some examples, the BWP manager 1345 may be configured as or otherwise support a means for operating in a first BWP for the PCell when communicating each burst of the set of multiple bursts, the first BWP having a first bandwidth. In some examples, the BWP manager 1345 may be configured as or otherwise support a means for switching to a second BWP for the PCell based on the burst periodicity, the second BWP having a second bandwidth that is less than the first bandwidth, where switching to the second BWP corresponds to switching the one or more SCells to the dormant state using the cell dormancy pattern.

In some examples, the BWP manager 1345 may be configured as or otherwise support a means for operating in an active BWP for each SCell of the one or more SCells when communicating each burst of the set of multiple bursts, the active BWP having a first bandwidth. In some examples, the BWP manager 1345 may be configured as or otherwise support a means for switching to a dormant BWP for the each SCell of the one or more SCells based on an inactivity timer, the dormant BWP having a second bandwidth that is less than the first bandwidth, where switching to the dormant BWP corresponds to switching the one or more SCells to the dormant state using the cell dormancy pattern.

In some examples, the communication burst manager 1325 may be configured as or otherwise support a means for transmitting, to the UE, scheduling information indicating at least one of the burst periodicity or one or more scheduling grants for the communications, where the burst periodicity is based on the scheduling information.

In some examples, to support configuring the cell dormancy pattern, the dormancy state manager 1335 may be configured as or otherwise support a means for determining that traffic is available at a packet data convergence protocol layer, where switching the one or more SCells to the active state using the cell dormancy pattern is based on the traffic being available.

In some examples, the dormancy pattern manager 1330 may be configured as or otherwise support a means for receiving, from the UE, a value of remaining battery power at the UE, where the cell dormancy pattern is based on the value of remaining battery power.

In some examples, the dormancy pattern manager 1330 may be configured as or otherwise support a means for receiving, from the UE, a charge status of the UE, where the cell dormancy pattern is based on the charge status, where the charge status includes at least one of an active charge status, an idle charge status, or an inactive charge status.

In some examples, the base station is operating according to one or more capabilities associated with a VR system, an AR system, a mixed reality system, a cloud gaming system, or a combination thereof.

Figure 14:
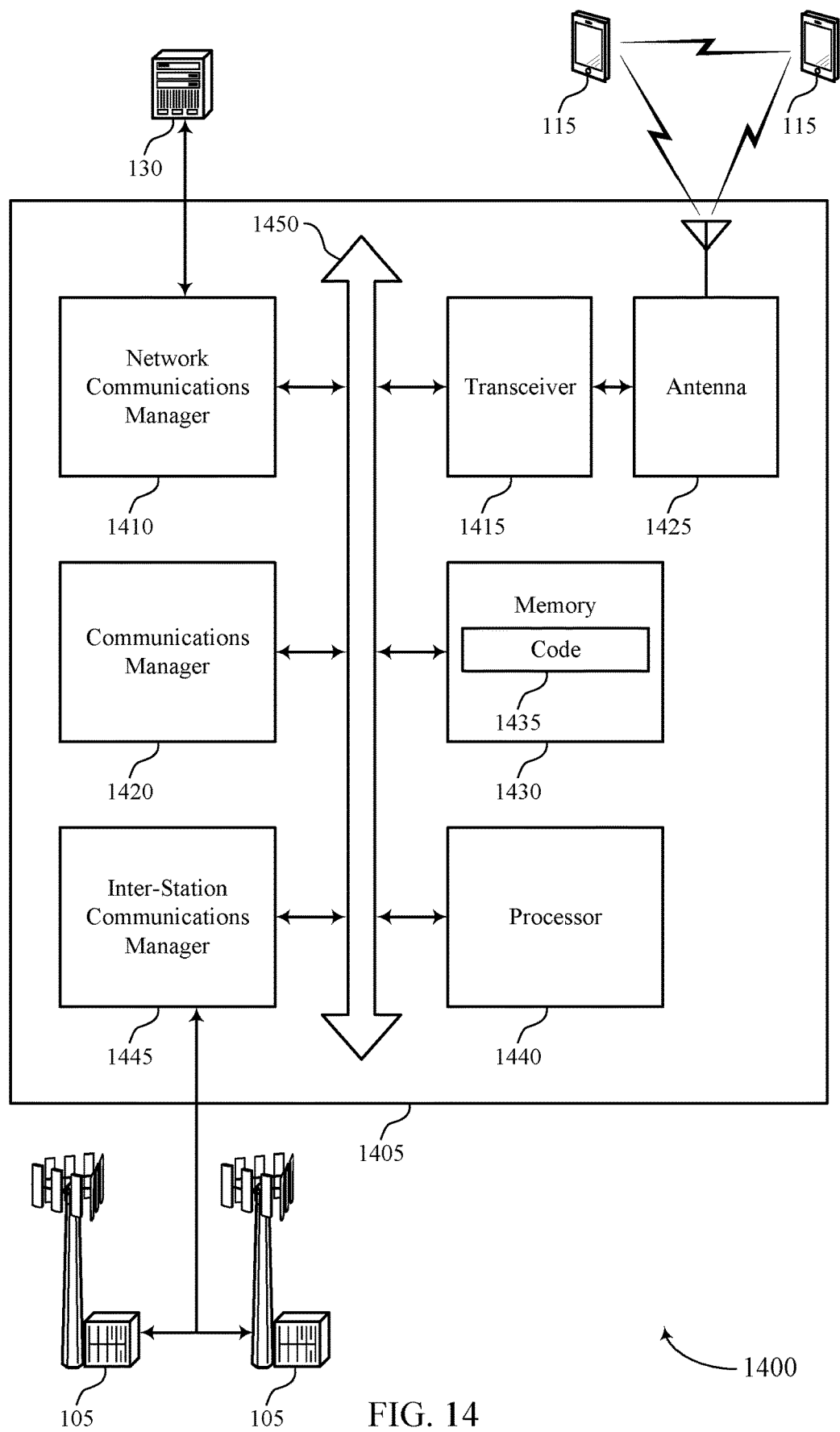
FIG. 14 shows a diagram of a system including a device that supports cell dormancy techniques for traffic in accordance with aspects of the present disclosure.

FIG. 14 shows a diagram of a system 1400 including a device 1405 that supports cell dormancy techniques for traffic in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory.

In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting cell dormancy techniques for traffic). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for identifying a burst periodicity associated with a set of multiple bursts of communications between the base station and a UE, where the set of multiple bursts are communicated over a PCell and one or more SCells in accordance with a multi-cell communications scheme. The communications manager 1420 may be configured as or otherwise support a means for configuring a cell dormancy pattern for switching the one or more SCells between an active state and a dormant state, where the cell dormancy pattern is based on the identified burst periodicity. The communications manager 1420 may be configured as or otherwise support a means for communicating the set of multiple bursts of the communications based on switching the one or more SCells between the active state to the dormant state using the cell dormancy pattern, where each burst of the set of multiple bursts is communicated while the one or more SCells are in the active state.

By including or configuring the communications manager 1420 in accordance with examples as described herein, the device 1405 may support techniques for a UE and a base station to switch dormancy states of a cell for a carrier frequency (e.g., a secondary cell (SCell) in communication with a primary cell (PCell)) based on a communication burst periodicity, which may improve communication reliability, reduce latency, improve user experience related to reduced processing, reduce power consumption, cause more efficient utilization of communication resources, improve coordination between devices, increase battery life, improve utilization of processing capability, or the like.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of cell dormancy techniques for traffic as described herein, or the processor 1440 and the memory 1430 may be otherwise configured to perform or support such operations.

Figure 15:
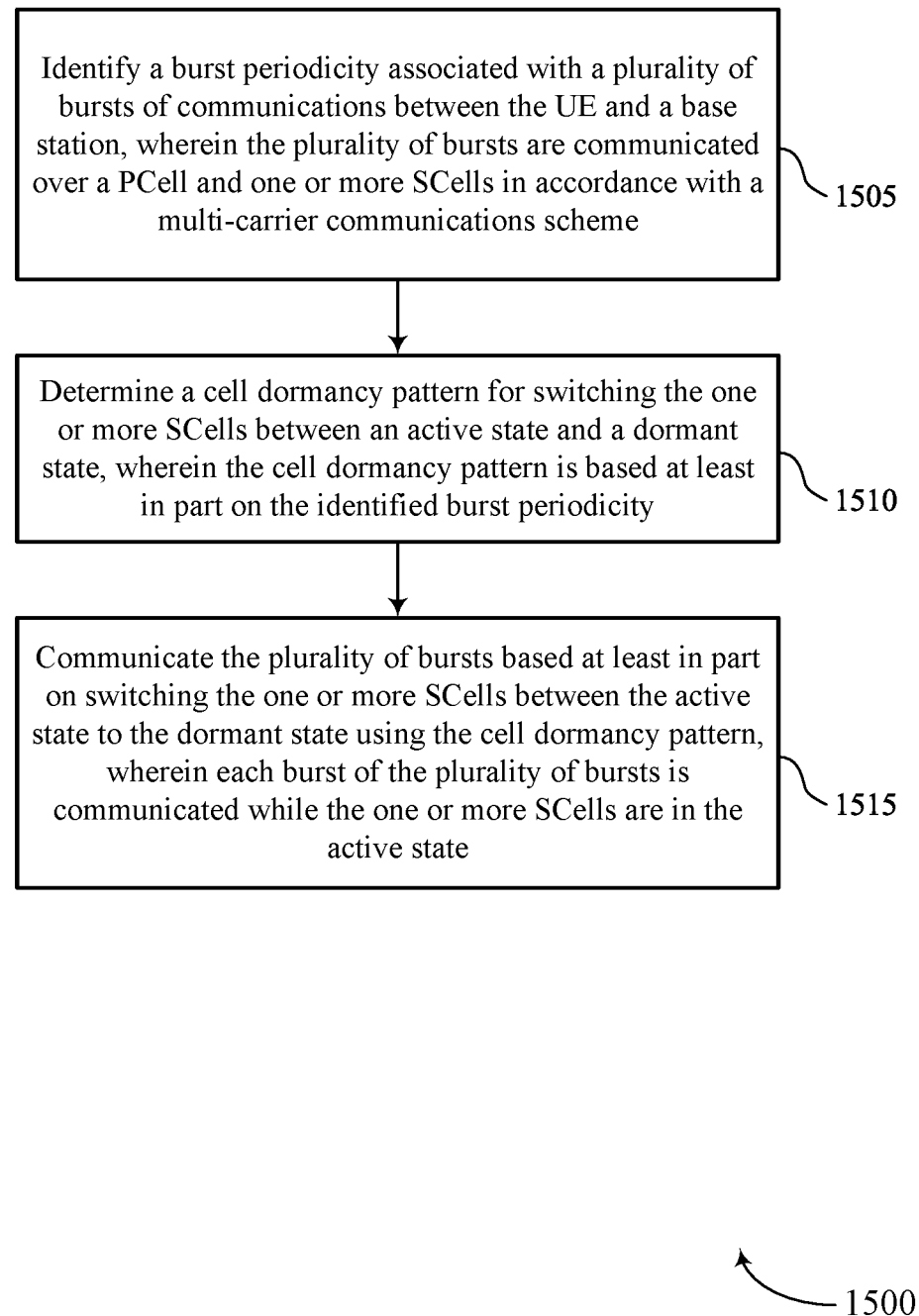
FIGS. 15 through 18 show flowcharts illustrating methods that support cell dormancy techniques for traffic in accordance with aspects of the present disclosure.

FIG. 15 shows a flowchart illustrating a method 1500 that supports cell dormancy techniques for traffic in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include identifying a burst periodicity associated with a set of multiple bursts of communications between the UE and a base station, where the set of multiple bursts are communicated over a PCell and one or more SCells in accordance with a multi-carrier communications scheme. The operations of 1505 may be performed in accordance with examples as disclosed herein. In some examples, aspects of the operations of 1505 may be performed by a communication burst component 925 as described with reference to FIG. 9.

At 1510, the method may include determining a cell dormancy pattern for switching the one or more SCells between an active state and a dormant state, where the cell dormancy pattern is based on the identified burst periodicity. The operations of 1510 may be performed in accordance with examples as disclosed herein. In some examples, aspects of the operations of 1510 may be performed by a dormancy pattern component 930 as described with reference to FIG. 9.

At 1515, the method may include communicating (e.g., transmitting, receiving) the set of multiple bursts based on switching the one or more SCells between the active state to the dormant state using the cell dormancy pattern, where each burst of the set of multiple bursts is communicated while the one or more SCells are in the active state. The operations of 1515 may be performed in accordance with examples as disclosed herein. In some examples, aspects of the operations of 1515 may be performed by a dormancy state component 935 as described with reference to FIG. 9.

Figure 16:
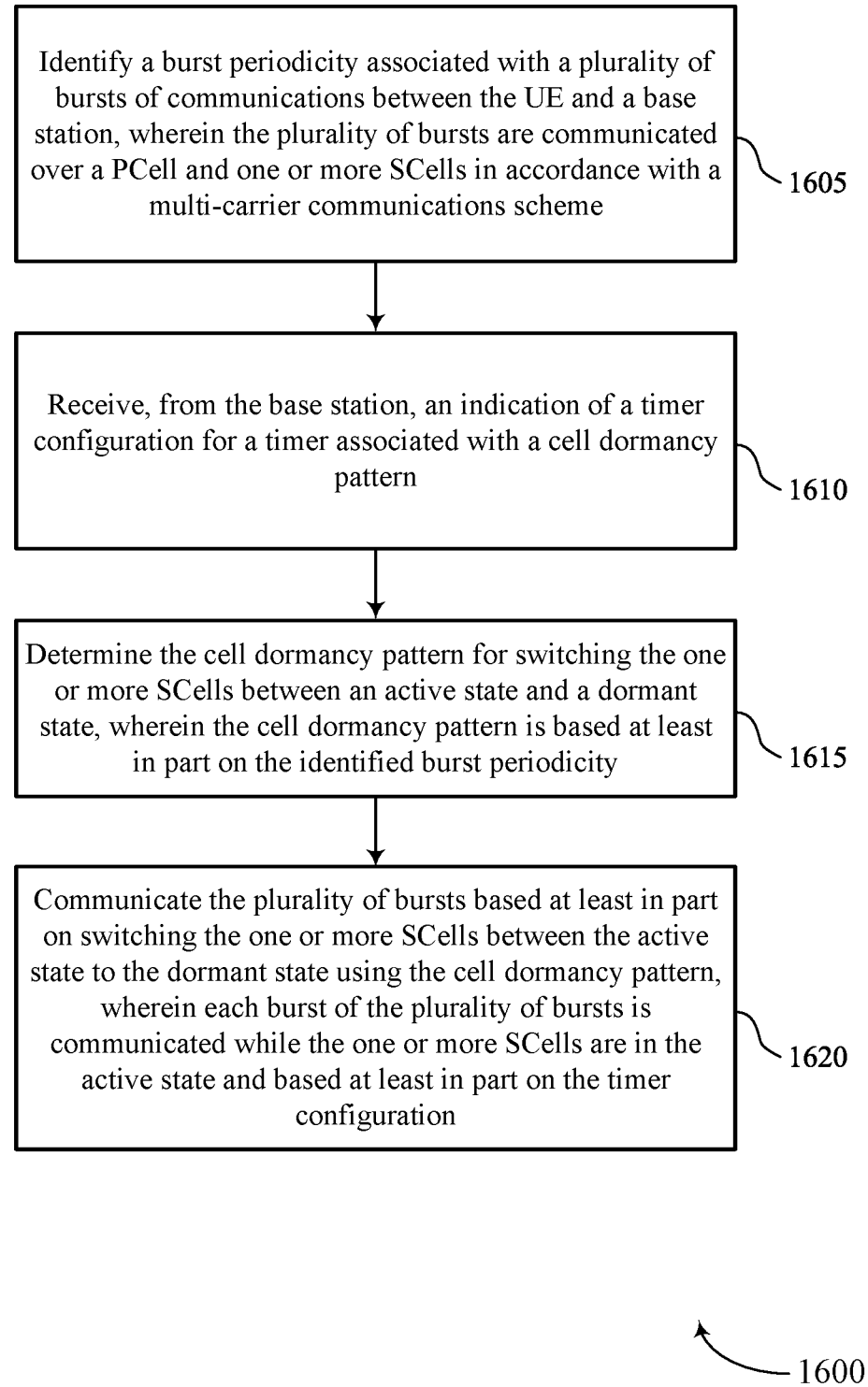

FIG. 16 shows a flowchart illustrating a method 1600 that supports cell dormancy techniques for traffic in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include identifying a burst periodicity associated with a set of multiple bursts of communications between the UE and a base station, where the set of multiple bursts are communicated over a PCell and one or more SCells in accordance with a multi-carrier communications scheme. The operations of 1605 may be performed in accordance with examples as disclosed herein. In some examples, aspects of the operations of 1605 may be performed by a communication burst component 925 as described with reference to FIG. 9.

At 1610, the method may include receiving, from the base station, an indication of a timer configuration for a timer associated with a cell dormancy pattern. The operations of 1610 may be performed in accordance with examples as disclosed herein. In some examples, aspects of the operations of 1610 may be performed by a timer component 940 as described with reference to FIG. 9.

At 1615, the method may include determining the cell dormancy pattern for switching the one or more SCells between an active state and a dormant state, where the cell dormancy pattern is based on the identified burst periodicity. The operations of 1615 may be performed in accordance with examples as disclosed herein. In some examples, aspects of the operations of 1615 may be performed by a dormancy pattern component 930 as described with reference to FIG. 9.

At 1620, the method may include communicating (e.g., transmitting, receiving) the set of multiple bursts based on switching the one or more SCells between the active state to the dormant state using the cell dormancy pattern, where each burst of the set of multiple bursts is communicated while the one or more SCells are in the active state and based on the timer configuration. The operations of 1620 may be performed in accordance with examples as disclosed herein. In some examples, aspects of the operations of 1620 may be performed by a dormancy state component 935 as described with reference to FIG. 9.

Figure 17:
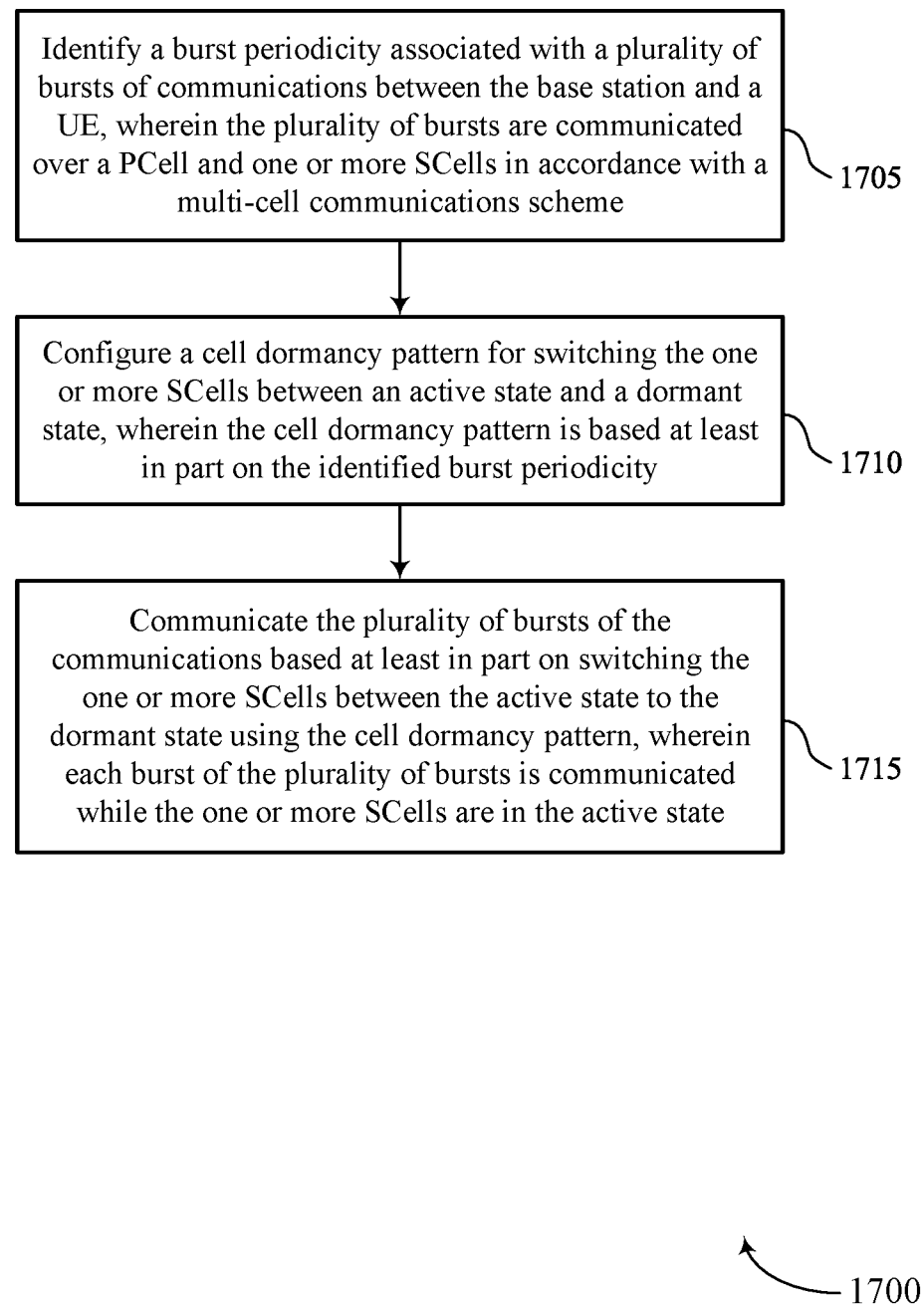

FIG. 17 shows a flowchart illustrating a method 1700 that supports cell dormancy techniques for traffic in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include identifying a burst periodicity associated with a set of multiple bursts of communications between the base station and a UE, where the set of multiple bursts are communicated over a PCell and one or more SCells in accordance with a multi-cell communications scheme. The operations of 1705 may be performed in accordance with examples as disclosed herein. In some examples, aspects of the operations of 1705 may be performed by a communication burst manager 1325 as described with reference to FIG. 13.

At 1710, the method may include configuring a cell dormancy pattern for switching the one or more SCells between an active state and a dormant state, where the cell dormancy pattern is based on the identified burst periodicity. The operations of 1710 may be performed in accordance with examples as disclosed herein. In some examples, aspects of the operations of 1710 may be performed by a dormancy pattern manager 1330 as described with reference to FIG. 13.

At 1715, the method may include communicating (e.g., transmitting, receiving) the set of multiple bursts of the communications based on switching the one or more SCells between the active state to the dormant state using the cell dormancy pattern, where each burst of the set of multiple bursts is communicated while the one or more SCells are in the active state. The operations of 1715 may be performed in accordance with examples as disclosed herein. In some examples, aspects of the operations of 1715 may be performed by a dormancy state manager 1335 as described with reference to FIG. 13.

Figure 18:
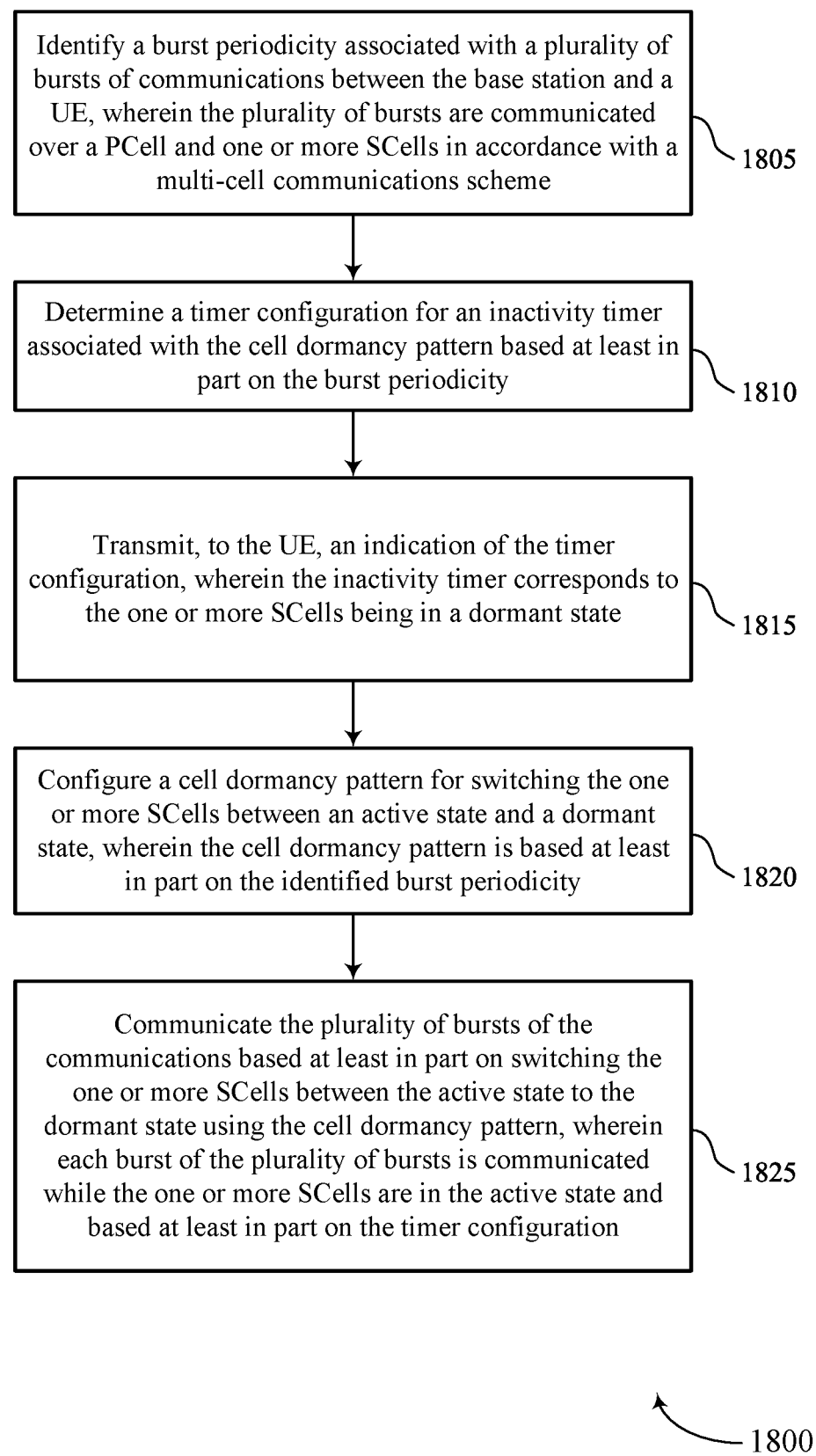

FIG. 18 shows a flowchart illustrating a method 1800 that supports cell dormancy techniques for traffic in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include identifying a burst periodicity associated with a set of multiple bursts of communications between the base station and a UE, where the set of multiple bursts are communicated over a PCell and one or more SCells in accordance with a multi-cell communications scheme. The operations of 1805 may be performed in accordance with examples as disclosed herein. In some examples, aspects of the operations of 1805 may be performed by a communication burst manager 1325 as described with reference to FIG. 13.

At 1810, the method may include determining a timer configuration for an inactivity timer associated with a cell dormancy pattern based on the burst periodicity. The operations of 1810 may be performed in accordance with examples as disclosed herein. In some examples, aspects of the operations of 1810 may be performed by a timer manager 1340 as described with reference to FIG. 13.

At 1815, the method may include transmitting, to the UE, an indication of the timer configuration, where the inactivity timer corresponds to the one or more SCells being in a dormant state. The operations of 1815 may be performed in accordance with examples as disclosed herein. In some examples, aspects of the operations of 1815 may be performed by a timer manager 1340 as described with reference to FIG. 13.

At 1820, the method may include configuring a cell dormancy pattern for switching the one or more SCells between an active state and a dormant state, where the cell dormancy pattern is based on the identified burst periodicity. The operations of 1820 may be performed in accordance with examples as disclosed herein. In some examples, aspects of the operations of 1820 may be performed by a dormancy pattern manager 1330 as described with reference to FIG. 13.

At 1825, the method may include communicating (e.g., transmitting, receiving) the set of multiple bursts of the communications based on switching the one or more SCells between the active state to the dormant state using the cell dormancy pattern, where each burst of the set of multiple bursts is communicated while the one or more SCells are in the active state and based on the timer configuration. The operations of 1825 may be performed in accordance with examples as disclosed herein. In some examples, aspects of the operations of 1825 may be performed by a dormancy state manager 1335 as described with reference to FIG. 13.

The following provides an overview of aspects of the present disclosure:

Aspect 1: A method for wireless communications at a UE, comprising: identifying a burst periodicity associated with a plurality of bursts of communications between the UE and a base station, wherein the plurality of bursts are communicated over a primary cell and one or more secondary cells in accordance with a multi-carrier communications scheme; determining a cell dormancy pattern for switching the one or more secondary cells between an active state and a dormant state, wherein the cell dormancy pattern is based at least in part on the identified burst periodicity; and communicating the plurality of bursts based at least in part on switching the one or more secondary cells between the active state to the dormant state using the cell dormancy pattern, wherein each burst of the plurality of bursts is communicated while the one or more secondary cells are in the active state.

Aspect 2: The method of aspect 1, further comprising: receiving, from the base station, an indication of a timer configuration for a timer associated with the cell dormancy pattern, wherein the plurality of bursts are communicated based at least in part on the timer configuration.

Aspect 3: The method of aspect 2, further comprising: starting the timer at a first time corresponding to arrival of a first burst of the plurality of bursts; and determining that the timer has expired at a second time after the first time based at least in part on the timer configuration, wherein a second burst of the plurality of bursts is communicated based at least in part on the timer expiring, and wherein the second burst is communicated based at least in part on the one or more secondary cells switching to the active state.

Aspect 4: The method of aspect 3, further comprising: resetting the timer according to the timer configuration based at least in part on determining that the timer has expired.

Aspect 5: The method of any of aspects 1 through 4, wherein switching the one or more secondary cells to the active state using the cell dormancy pattern is based at least in part on an availability of traffic associated with the communications.

Aspect 6: The method of any of aspects 1 through 5, further comprising: operating in a first bandwidth part for the primary cell when the one or more secondary cells are in the active state, the first bandwidth part having a first bandwidth; and switching to a second bandwidth part for the primary cell based at least in part on the burst periodicity, the second bandwidth part having a second bandwidth that is less than the first bandwidth, wherein switching to the second bandwidth part corresponds to a duration for switching the one or more secondary cells to the dormant state using the cell dormancy pattern.

Aspect 7: The method of aspect 6, further comprising: modifying a downlink control monitoring periodicity on the primary cell based at least in part on switching to the second bandwidth part of the primary cell.

Aspect 8: The method of any of aspects 6 through 7, further comprising: modifying a parameter value corresponding to a slot offset between a scheduling grant and data reception on the primary cell based at least in part on switching to the second bandwidth part of the primary cell.

Aspect 9: The method of any of aspects 1 through 8, further comprising: operating in an active bandwidth part for each secondary cell of the one or more secondary cells when communicating each burst of the plurality of bursts, the active bandwidth part having a first bandwidth; and switching to a dormant bandwidth part for the each secondary cell of the one or more secondary cells based at least in part on an inactivity timer, the dormant bandwidth part having a second bandwidth that is less than the first bandwidth, wherein switching to the dormant bandwidth part corresponds to switching the one or more secondary cells to the dormant state using the cell dormancy pattern.

Aspect 10: The method of any of aspects 1 through 9, wherein identifying the burst periodicity comprises: receiving scheduling information indicating at least one of the burst periodicity or one or more scheduling grants for the plurality of bursts of the communications; and identifying the burst periodicity based at least in part on the scheduling information.

Aspect 11: The method of any of aspects 1 through 10, further comprising: receiving, from the base station, downlink control signaling indicating a switch to a dormant bandwidth part, wherein the downlink control signaling is triggered by a packet data convergence protocol buffer status corresponding to empty; and switching from an active bandwidth part to the dormant bandwidth part based at least in part on the downlink control signaling.

Aspect 12: The method of any of aspects 1 through 11, further comprising: transmitting, to the base station, a value of remaining battery power at the UE, wherein one or more parameters associated with the cell dormancy pattern is based at least in part on the value of remaining battery power.

Aspect 13: The method of any of aspects 1 through 12, further comprising: transmitting, to the base station, a charging status of the UE, wherein one or more parameters associated with the cell dormancy pattern is based at least in part on the charging status, wherein the charging status comprises at least one of an active charge status, an idle charge status, or an inactive charge status.

Aspect 14: The method of any of aspects 1 through 13, wherein the UE is operating according to one or more capabilities associated with a virtual reality system, an augmented reality system, a mixed reality system, a cloud gaming system, or a combination thereof.

Aspect 15: A method for wireless communications at a base station, comprising: identifying a burst periodicity associated with a plurality of bursts of communications between the base station and a UE, wherein the plurality of bursts are communicated over a primary cell and one or more secondary cells in accordance with a multi-cell communications scheme; configuring a cell dormancy pattern for switching the one or more secondary cells between an active state and a dormant state, wherein the cell dormancy pattern is based at least in part on the identified burst periodicity; and communicating the plurality of bursts of the communications based at least in part on switching the one or more secondary cells between the active state to the dormant state using the cell dormancy pattern, wherein each burst of the plurality of bursts is communicated while the one or more secondary cells are in the active state.

Aspect 16: The method of aspect 15, further comprising: determining a timer configuration for an inactivity timer associated with the cell dormancy pattern based at least in part on the burst periodicity; and transmitting, to the UE, an indication of the timer configuration, wherein the plurality of bursts are communicated based at least in part on the timer configuration, and wherein the inactivity timer corresponds to the one or more secondary cells being in the dormant state.

Aspect 17: The method of any of aspects 15 through 16, further comprising: determining that an application layer is preparing for at least one burst of the plurality of bursts, wherein switching the one or more secondary cells to the active state using the cell dormancy pattern is based at least in part on the application layer preparing for the at least one burst.

Aspect 18: The method of any of aspects 15 through 17, wherein identifying the burst periodicity comprises: determining a buffer status of a packet data convergence protocol buffer; and identifying the burst periodicity based at least in part on the buffer status comprising an empty status.

Aspect 19: The method of aspect 18, further comprising: transmitting, to the UE and based at least in part on the buffer status comprising the empty status, downlink control signaling indicating a switch from an active bandwidth part to a dormant bandwidth part.

Aspect 20: The method of any of aspects 15 through 19, wherein identifying the burst periodicity comprises: identifying a set of metadata associated with the communications based at least in part on reading one or more packet headers of the communications; and identifying the burst periodicity based at least in part on the set of metadata.

Aspect 21: The method of aspect 20, further comprising: transmitting, to the UE and based at least in part on the set of metadata, downlink control signaling indicating a switch from first bandwidth part to a second bandwidth part, wherein the first bandwidth part has a first bandwidth that is greater than a second bandwidth of the second bandwidth part, and wherein the second bandwidth part is associated with the dormant state of the one or more secondary cells.

Aspect 22: The method of any of aspects 15 through 21, further comprising: operating in a first bandwidth part for the primary cell when communicating each burst of the plurality of bursts, the first bandwidth part having a first bandwidth; and switching to a second bandwidth part for the primary cell based at least in part on the burst periodicity, the second bandwidth part having a second bandwidth that is less than the first bandwidth, wherein switching to the second bandwidth part corresponds to switching the one or more secondary cells to the dormant state using the cell dormancy pattern.

Aspect 23: The method of any of aspects 15 through 22, further comprising: operating in an active bandwidth part for each secondary cell of the one or more secondary cells when communicating each burst of the plurality of bursts, the active bandwidth part having a first bandwidth; and switching to a dormant bandwidth part for the each secondary cell of the one or more secondary cells based at least in part on an inactivity timer, the dormant bandwidth part having a second bandwidth that is less than the first bandwidth, wherein switching to the dormant bandwidth part corresponds to switching the one or more secondary cells to the dormant state using the cell dormancy pattern.

Aspect 24: The method of any of aspects 15 through 23, further comprising: transmitting, to the UE, scheduling information indicating at least one of the burst periodicity or one or more scheduling grants for the communications, wherein the burst periodicity is based at least in part on the scheduling information.

Aspect 25: The method of any of aspects 15 through 24, wherein configuring the cell dormancy pattern comprises: determining that traffic is available at a packet data convergence protocol layer, wherein switching the one or more secondary cells to the active state using the cell dormancy pattern is based at least in part on the traffic being available.

Aspect 26: The method of any of aspects 15 through 25, further comprising: receiving, from the UE, a value of remaining battery power at the UE, wherein the cell dormancy pattern is based at least in part on the value of remaining battery power.

Aspect 27: The method of any of aspects 15 through 26, further comprising: receiving, from the UE, a charge status of the UE, wherein the cell dormancy pattern is based at least in part on the charge status, wherein the charge status comprises at least one of an active charge status, an idle charge status, or an inactive charge status.

Aspect 28: The method of any of aspects 15 through 27, wherein the base station is operating according to one or more capabilities associated with a virtual reality system, an augmented reality system, a mixed reality system, a cloud gaming system, or a combination thereof.

Aspect 29: An apparatus for wireless communications at a UE, comprising a processor; memory coupled with the processor; and instructions stored in the memory and executable by the processor to cause the apparatus to perform a method of any of aspects 1 through 14.

Aspect 30: An apparatus for wireless communications at a UE, comprising at least one means for performing a method of any of aspects 1 through 14.

Aspect 31: A non-transitory computer-readable medium storing code for wireless communications at a UE, the code comprising instructions executable by a processor to perform a method of any of aspects 1 through 14.

Aspect 32: An apparatus for wireless communications at a base station, comprising a processor; memory coupled with the processor; and instructions stored in the memory and executable by the processor to cause the apparatus to perform a method of any of aspects 15 through 28.

Aspect 33: An apparatus for wireless communications at a base station, comprising at least one means for performing a method of any of aspects 15 through 28.

Aspect 34: A non-transitory computer-readable medium storing code for wireless communications at a base station, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    identifying a burst periodicity associated with a plurality of bursts of communications between the UE and a base station, wherein the plurality of bursts are communicated over a primary cell and one or more secondary cells in accordance with a multi-carrier communications scheme;
    determining a cell dormancy pattern for switching the one or more secondary cells between an active state and a dormant state, wherein the cell dormancy pattern is based at least in part on the identified burst periodicity; and
    communicating the plurality of bursts based at least in part on switching the one or more secondary cells between the active state to the dormant state using the cell dormancy pattern, wherein each burst of the plurality of bursts is communicated while the one or more secondary cells are in the active state.

2. The method of claim 1, further comprising:
receiving, from the base station, an indication of a timer configuration for a timer associated with the cell dormancy pattern, wherein the plurality of bursts are communicated based at least in part on the timer configuration.

3. The method of claim 2, further comprising:
starting the timer at a first time corresponding to arrival of a first burst of the plurality of bursts; and
determining that the timer has expired at a second time after the first time based at least in part on the timer configuration, wherein a second burst of the plurality of bursts is communicated based at least in part on the timer expiring, and wherein the second burst is communicated based at least in part on the one or more secondary cells switching to the active state.

4. The method of claim 3, further comprising:
resetting the timer according to the timer configuration based at least in part on determining that the timer has expired.

5. The method of claim 1, wherein switching the one or more secondary cells to the active state using the cell dormancy pattern is based at least in part on an availability of traffic associated with the communications.

6. The method of claim 1, further comprising:
operating in a first bandwidth part for the primary cell when the one or more secondary cells are in the active state, the first bandwidth part having a first bandwidth; and
switching to a second bandwidth part for the primary cell based at least in part on the burst periodicity, the second bandwidth part having a second bandwidth that is less than the first bandwidth, wherein switching to the second bandwidth part corresponds to a duration for switching the one or more secondary cells to the dormant state using the cell dormancy pattern.

7. The method of claim 6, further comprising:
modifying a downlink control monitoring periodicity on the primary cell based at least in part on switching to the second bandwidth part of the primary cell.

8. The method of claim 6, further comprising:
modifying a parameter value corresponding to a slot offset between a scheduling grant and data reception on the primary cell based at least in part on switching to the second bandwidth part of the primary cell.

9. The method of claim 1, further comprising:
operating in an active bandwidth part for each secondary cell of the one or more secondary cells when communicating each burst of the plurality of bursts, the active bandwidth part having a first bandwidth; and
switching to a dormant bandwidth part for the each secondary cell of the one or more secondary cells based at least in part on an inactivity timer, the dormant bandwidth part having a second bandwidth that is less than the first bandwidth, wherein switching to the dormant bandwidth part corresponds to switching the one or more secondary cells to the dormant state using the cell dormancy pattern.

10. The method of claim 1, wherein identifying the burst periodicity comprises:
receiving scheduling information indicating at least one of the burst periodicity or one or more scheduling grants for the plurality of bursts of the communications; and
identifying the burst periodicity based at least in part on the scheduling information.

11. The method of claim 1, further comprising:
receiving, from the base station, downlink control signaling indicating a switch to a dormant bandwidth part, wherein the downlink control signaling is triggered by a packet data convergence protocol buffer status corresponding to empty; and
switching from an active bandwidth part to the dormant bandwidth part based at least in part on the downlink control signaling.

12. The method of claim 1, further comprising:
transmitting, to the base station, a value of remaining battery power at the UE, wherein one or more parameters associated with the cell dormancy pattern is based at least in part on the value of remaining battery power.

13. The method of claim 1, further comprising:
transmitting, to the base station, a charging status of the UE, wherein one or more parameters associated with the cell dormancy pattern is based at least in part on the charging status, wherein the charging status comprises at least one of an active charge status, an idle charge status, or an inactive charge status.

14. The method of claim 1, wherein the UE is operating according to one or more capabilities associated with a virtual reality system, an augmented reality system, a mixed reality system, a cloud gaming system, or a combination thereof.

15. A method for wireless communications at a base station, comprising:
identifying a burst periodicity associated with a plurality of bursts of communications between the base station and a user equipment (UE), wherein the plurality of bursts are communicated over a primary cell and one or more secondary cells in accordance with a multi-cell communications scheme;
configuring a cell dormancy pattern for switching the one or more secondary cells between an active state and a dormant state, wherein the cell dormancy pattern is based at least in part on the identified burst periodicity; and
communicating the plurality of bursts of the communications based at least in part on switching the one or more secondary cells between the active state to the dormant state using the cell dormancy pattern, wherein each burst of the plurality of bursts is communicated while the one or more secondary cells are in the active state.

16. The method of claim 15, further comprising:
determining a timer configuration for an inactivity timer associated with the cell dormancy pattern based at least in part on the burst periodicity; and
transmitting, to the UE, an indication of the timer configuration, wherein the plurality of bursts are communicated based at least in part on the timer configuration, and wherein the inactivity timer corresponds to the one or more secondary cells being in the dormant state.

17. The method of claim 15, further comprising:
determining that an application layer is preparing for at least one burst of the plurality of bursts, wherein switching the one or more secondary cells to the active state using the cell dormancy pattern is based at least in part on the application layer preparing for the at least one burst.

18. The method of claim 15, wherein identifying the burst periodicity comprises:
determining a buffer status of a packet data convergence protocol buffer; and
identifying the burst periodicity based at least in part on the buffer status comprising an empty status.

19. The method of claim 18, further comprising:
transmitting, to the UE and based at least in part on the buffer status comprising the empty status, downlink control signaling indicating a switch from an active bandwidth part to a dormant bandwidth part.

20. The method of claim 15, wherein identifying the burst periodicity comprises:
identifying a set of metadata associated with the communications based at least in part on reading one or more packet headers of the communications; and
identifying the burst periodicity based at least in part on the set of metadata.

21. The method of claim 20, further comprising:
transmitting, to the UE and based at least in part on the set of metadata, downlink control signaling indicating a switch from first bandwidth part to a second bandwidth part, wherein the first bandwidth part has a first bandwidth that is greater than a second bandwidth of the second bandwidth part, and wherein the second bandwidth part is associated with the dormant state of the one or more secondary cells.

22. The method of claim 15, further comprising:
operating in a first bandwidth part for the primary cell when communicating each burst of the plurality of bursts, the first bandwidth part having a first bandwidth; and
switching to a second bandwidth part for the primary cell based at least in part on the burst periodicity, the second bandwidth part having a second bandwidth that is less than the first bandwidth, wherein switching to the second bandwidth part corresponds to switching the one or more secondary cells to the dormant state using the cell dormancy pattern.

23. The method of claim 15, further comprising:
operating in an active bandwidth part for each secondary cell of the one or more secondary cells when communicating each burst of the plurality of bursts, the active bandwidth part having a first bandwidth; and
switching to a dormant bandwidth part for the each secondary cell of the one or more secondary cells based at least in part on an inactivity timer, the dormant bandwidth part having a second bandwidth that is less than the first bandwidth, wherein switching to the dormant bandwidth part corresponds to switching the one or more secondary cells to the dormant state using the cell dormancy pattern.

24. The method of claim 15, further comprising:
transmitting, to the UE, scheduling information indicating at least one of the burst periodicity or one or more scheduling grants for the communications, wherein the burst periodicity is based at least in part on the scheduling information.

25. The method of claim 15, wherein configuring the cell dormancy pattern comprises:
determining that traffic is available at a packet data convergence protocol layer, wherein switching the one or more secondary cells to the active state using the cell dormancy pattern is based at least in part on the traffic being available.

26. The method of claim 15, further comprising:
receiving, from the UE, a value of remaining battery power at the UE, wherein the cell dormancy pattern is based at least in part on the value of remaining battery power.

27. The method of claim 15, further comprising:
receiving, from the UE, a charge status of the UE, wherein the cell dormancy pattern is based at least in part on the charge status, wherein the charge status comprises at least one of an active charge status, an idle charge status, or an inactive charge status.

28. The method of claim 15, wherein the base station is operating according to one or more capabilities associated with a virtual reality system, an augmented reality system, a mixed reality system, a cloud gaming system, or a combination thereof.

29. An apparatus for wireless communications at a user equipment (UE), comprising:
a processor;
memory coupled with the processor; and
instructions stored in the memory and executable by the processor to cause the apparatus to:
identify a burst periodicity associated with a plurality of bursts of communications between the UE and a base station, wherein the plurality of bursts are communicated over a primary cell and one or more secondary cells in accordance with a multi-carrier communications scheme;
determine a cell dormancy pattern for switching the one or more secondary cells between an active state and a dormant state, wherein the cell dormancy pattern is based at least in part on the identified burst periodicity; and
communicate the plurality of bursts based at least in part on switching the one or more secondary cells between the active state to the dormant state using the cell dormancy pattern, wherein each burst of the plurality of bursts is communicated while the one or more secondary cells are in the active state.

30. An apparatus for wireless communications at a base station, comprising:
a processor;
memory coupled with the processor; and
instructions stored in the memory and executable by the processor to cause the apparatus to:
identify a burst periodicity associated with a plurality of bursts of communications between the base station and a user equipment (UE), wherein the plurality of bursts are communicated over a primary cell and one or more secondary cells in accordance with a multi-cell communications scheme;
configure a cell dormancy pattern for switching the one or more secondary cells between an active state and a dormant state, wherein the cell dormancy pattern is based at least in part on the identified burst periodicity; and
communicate the plurality of bursts of the communications based at least in part on switching the one or more secondary cells between the active state to the dormant state using the cell dormancy pattern, wherein each burst of the plurality of bursts is communicated while the one or more secondary cells are in the active state.

* * * * *